(12) United States Patent
Furukawa et al.

(10) Patent No.: US 10,714,057 B2
(45) Date of Patent: Jul. 14, 2020

(54) DISPLAY SYSTEM AND DISPLAY METHOD

(71) Applicant: Sharp Kabushiki Kaisha, Sakai, Osaka (JP)

(72) Inventors: Katsuyasu Furukawa, Sakai (JP); Akinori Ohnishi, Sakai (JP); Noriyoshi Kanki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/265,388

(22) Filed: Feb. 1, 2019

(65) Prior Publication Data
US 2019/0164523 A1 May 30, 2019

Related U.S. Application Data

(63) Continuation of application No. 15/533,679, filed as application No. PCT/JP2015/084370 on Dec. 8, 2015, now Pat. No. 10,235,974.

(30) Foreign Application Priority Data

Dec. 9, 2014 (JP) ................................. 2014-248950

(51) Int. Cl.
*G09G 5/34* (2006.01)
*G06F 3/14* (2006.01)
(Continued)

(52) U.S. Cl.
CPC .............. *G09G 5/34* (2013.01); *G06F 3/0483* (2013.01); *G06F 3/1423* (2013.01);
(Continued)

(58) Field of Classification Search
CPC ............... G09G 5/14; G09G 5/34; G06T 3/20
See application file for complete search history.

(56) References Cited

U.S. PATENT DOCUMENTS 8,842,113 B1 * 9/2014 Holt ......................... G09G 5/12
345/419
2007/0005809 A1 1/2007 Kobayashi et al.
(Continued)

FOREIGN PATENT DOCUMENTS

JP 2001-117544 A 4/2001
JP 2003-091490 A 3/2003
(Continued)

OTHER PUBLICATIONS

Furukawa et al., "Display System and Display Method", U.S. Appl. No. 15/533,679, filed Jun. 7, 2017.

*Primary Examiner* — Ryan R Yang
(74) *Attorney, Agent, or Firm* — Keating & Bennett, LLP

(57) ABSTRACT

A display system displays, on each of a plurality of display devices arranged side by side, among image data of a plurality of pages, each of image data of the number of display devices, and reflects input information, which indicates information input by a user, on image data displayed on a master display device among the plurality of display devices. Moreover, the display system displays, on each of the plurality of display devices, among the image data of the plurality of pages, each of image data which is obtained by shifting the image data of the number of display devices in accordance with an operation on a page operation unit. Thereby, a viewer is able to view image data of several pages at once, and it is possible to reflect information input by a user even when image data of a target page is shifted backward or forward.

8 Claims, 21 Drawing Sheets

(51) Int. Cl.
*G06F 3/0483* (2013.01)
*G06T 3/20* (2006.01)
*G09G 5/14* (2006.01)

(52) U.S. Cl.
CPC .............. *G06F 3/1446* (2013.01); *G06T 3/20* (2013.01); *G09G 5/14* (2013.01); *G09G 2340/0478* (2013.01); *G09G 2354/00* (2013.01)

(56) References Cited

U.S. PATENT DOCUMENTS

2007/0106950 A1* 5/2007 Hutchinson ........... G06F 3/0486
715/761
2012/0096360 A1   4/2012 Nishikawa

FOREIGN PATENT DOCUMENTS

| JP | 2005-107467 A |   | 4/2005 |
|----|---------------|---|--------|
| JP | 2009-163142 A |   | 7/2009 |
| JP | 2009-251287 A |   | 10/2009 |
| JP | 2009-251867 A |   | 10/2009 |
| JP | 2014149714 A  | * | 8/2014 |

* cited by examiner

DISPLAY SYSTEM AND DISPLAY METHOD

TECHNICAL FIELD

The present invention relates to a display system and a display method that display image data on a plurality of display devices.

BACKGROUND ART

In a case where a user (for example, a teacher) teaches a viewer (for example, a student) by using image data of a plurality of pages as a teaching material, the user displays the plurality of pages individually on one display device. For example, the user displays image data of a first page on the display device to explain the image data of the first page. Then, the user displays image data of a second page on the display device to explain the image data of the second page. The viewer is thereby able to listen to the explanation on the image data of the first page while viewing the image data of the first page, and listen to the explanation on the image data of the second page while viewing the image data of the second page.

However, pages of image data to be displayed on the display device are switched one by one, so that it is difficult for the viewer to view the image data of the plurality of pages at once. That is, when displaying the image data of the second page on the display device, the user switches image data to be displayed on the display device from the image data of the first page to the image data of the second page, so that it is difficult for the viewer to view the image data of the first page and the second page at once.

Moreover, in a case where one display device is used as a touch panel display, a user displays image data of a first page on the display device to explain the image data of the first page, and inputs, to the display device, information (input information) indicating an explanatory note accompanying the image data of the first page. A viewer is thereby able to listen to the explanation on the image data of the first page while viewing the image data of the first page and the explanatory note. As above, it is desired that a viewer is able to view image data of several pages at once.

However, since pages of image data to be displayed on the display device are switched one by one, the input information input by the user is not reflected on image data to be displayed on the display device in some cases. That is, in a case where the explanatory note accompanying the image data of the first page has no relation with image data of a second page, the explanatory note accompanying the image data of the first page is not reflected on the image data of the second page. In this case, when switching image data to be displayed on the display device from the image data of the first page to the image data of the second page, the user is required to delete the explanatory note accompanying the image data of the first page from the display device. As above, it is desired that information (input information) input by a user is reflected on target image data.

Techniques of displaying image data on a plurality of display devices are disclosed in PTL 1 and 2.

In a technique described in PTL 1, when image data is displayed on a first display device, image data same as the image data that is displayed on the first display device is displayed on a second display device by using a screen capturer.

In a technique described in PTL 2, when a user inputs information (comment) to image data displayed on a first display device, image data (image data in which the comment is reflected) same as the image data displayed on the first display device is displayed on a second display device by using a screen capturer.

CITATION LIST

Patent Literature

PTL 1: Japanese Unexamined Patent Application Publication No. 2003-69767
PTL 2: Japanese Unexamined Patent Application Publication No. 2014-22861

SUMMARY OF INVENTION

Technical Problem

However, each of the techniques described in PTLs 1 and 2 is used for displaying the image data, which is the same as the image data displayed on the first display device, on the second display device, so that it is difficult for a viewer to view image data of several pages at once.

The invention is made in view of the aforementioned conventional problems, and an object thereof is to provide a display system and a display method by which a viewer is able to view image data of several pages at once and, even when image data of a target page is shifted backward or forward, information input by a user is able to be reflected.

Solution to Problem

In a first aspect of the invention, a display system includes: a plurality of display devices that are arranged side by side; an input detection device that detects an input performed by a user to a master display device which is a display device designated from the plurality of display devices; and a control device that is connected to the plurality of display devices and the input detection device, in which the control device includes an image data display control unit that displays, on each of the plurality of display devices, among image data of a plurality of pages, each of image data of a number corresponding to a number of the plurality of display devices, an input reflection display control unit that reflects input information, which indicates information input by the user, on image data of the image data of the number of display devices, which is displayed on the master display device, and a page operation unit by which page feeding or page returning is performed to the image data of the number of display devices, which is displayed on the plurality of display devices, and in a case where the page operation unit is operated, the image data display control unit displays, on each of the plurality of display devices, among the image data of the plurality of pages, each of image data which is obtained by shifting the image data of the number of display devices in accordance with an operation on the page operation unit.

In a second aspect of the invention, in the first aspect, in a case where the image data of the number of display devices is subjected to page feeding, the input information is reflected on, of the image data of the plurality of pages, image data of a page previous to the image data displayed on the master display device.

In a third aspect of the invention, in the first aspect or the second aspect, each of the plurality of display devices includes image data display region that serves as a display region on which image data is displayed, the master display device of the plurality of display devices further includes a page operation display region that serves as a display region on which the page operation unit is displayed, and the input detection device detects, as the input information, an input performed by the user to the image data display region of the master display device, and detects, as an operation on the page operation unit, an input performed by the user to the page operation display region of the master display device.

In a fourth aspect of the invention, in any one of the first aspect to the third aspect, in a case where there are N display devices as the plurality of display devices, one or a plurality of display devices, a number of which is less than N, are designated as master display devices.

In a fifth aspect of the invention, in any one of the first aspect to the fourth aspect, the plurality of display devices are arranged so as to be arrayed in a horizontal direction, the image data display control unit displays, on each of the plurality of display devices, among the image data display of the plurality of pages, each of the image data of the number corresponding to the number of the plurality of display devices so as to be arrayed from a left side to a right side in order, in a case where letters represented by the image data of the plurality of pages are horizontally written, and displays, on each of the plurality of display devices, among the image data of the plurality of pages, each of the image data of the number corresponding to the number of the plurality of display devices so as to be arrayed from the right side to the left side in order, in a case where letters represented by the image data of the plurality of pages are vertically written.

In a sixth aspect of the invention, in any one of the first aspect to the fifth aspect, the plurality of display devices are arranged in a ring shape so that each display surface thereof serves as an inner peripheral surface.

In a seventh aspect of the invention, in any one of the first aspect to the sixth aspect, the plurality of display devices and control devices are constituted by a plurality of groups, the control device of a master group that is a group among the plurality of groups, which is designated, displays, on each of a plurality of display devices in the master group, among the image data of the plurality of pages, each of image data of a number corresponding to a number of the plurality of display devices in the master group, and transmits the image data of the number of display devices to the control device of a slave group among the plurality of groups, which is a group other than the master group, and the control device of the slave group displays, on each of a plurality of display devices in the slave group, among the image data of the number of display devices from the control device of the master group, each of image data of a number corresponding to a number of the plurality of display devices in the slave group.

In an eighth aspect of the invention, in the seventh aspect, each of the plurality of groups is provided in a different region, and the control device of the master group is connected to the control device of the slave group via a network.

In a ninth aspect of the invention, a display method includes the steps of: detecting an input performed by a user to a master display device that is a display device designated from a plurality of display devices which are arranged side by side; displaying, on each of the plurality of display devices, among image data of a plurality of pages, each of image data of a number corresponding to a number of the plurality of display devices; reflecting input information, which indicates information input by the user, on image data of the image data of the number of display devices, which is displayed on the master display device; and displaying, in a case where a page operation unit by which page feeding or page returning is performed to each of the image data of the number of display devices, which is displayed on each of the plurality of display devices, is operated, on each of the plurality of display devices, among the image data of the plurality of pages, each of image data which is obtained by shifting the image data of the number of display devices in accordance with an operation on the page operation unit.

Advantageous Effects of Invention

According to the invention, a viewer is able to view image data of several pages at once, and, even when image data of a target page is shifted backward or forward, information input by a user is able to be reflected.

DESCRIPTION OF EMBODIMENTS

Hereinafter, embodiments of the invention will be described with reference to drawings.

First Embodiment

Figure 1:
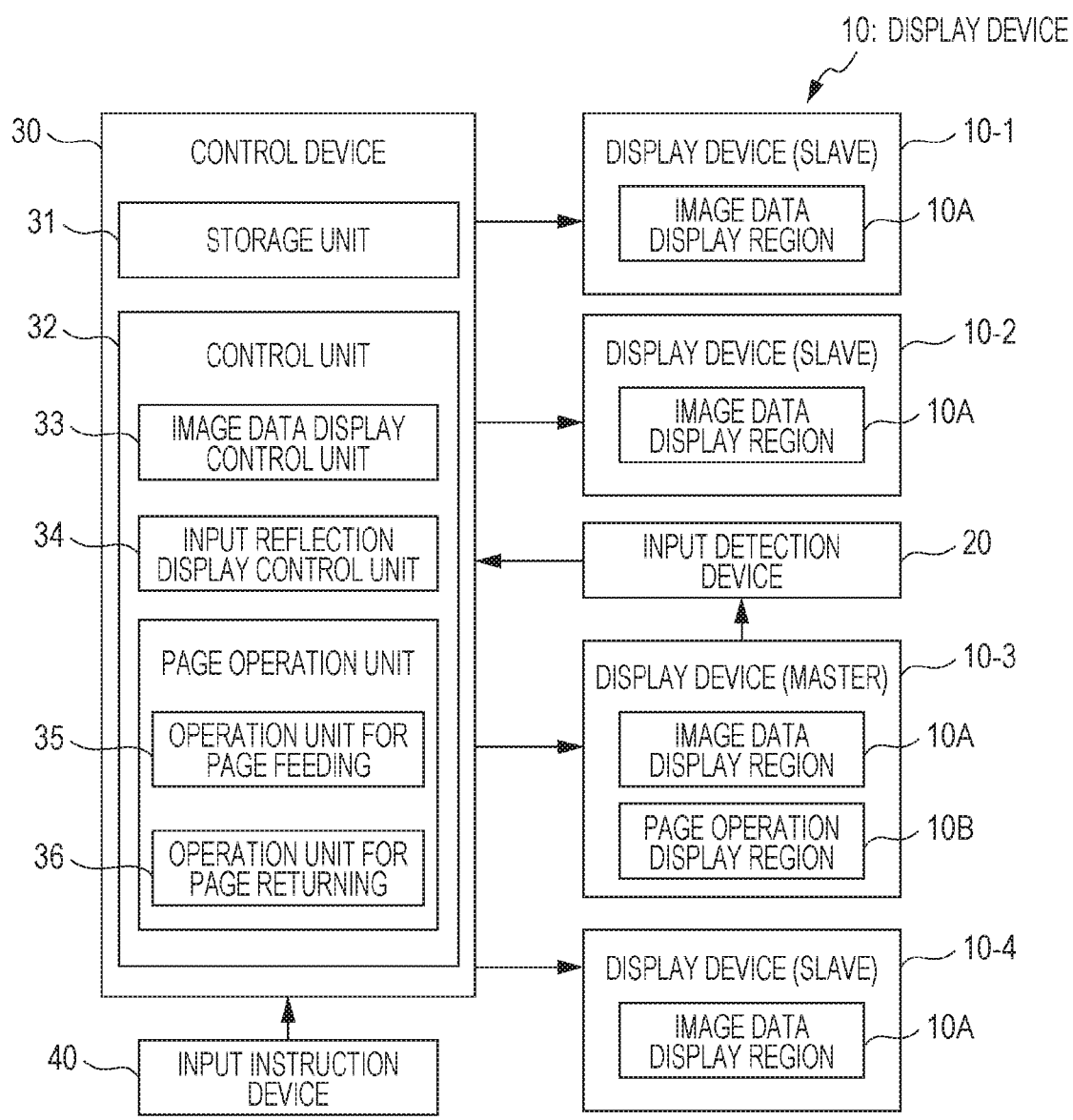
FIG. 1 is a block diagram illustrating a configuration of a display system according to a first embodiment.
Figure 2:
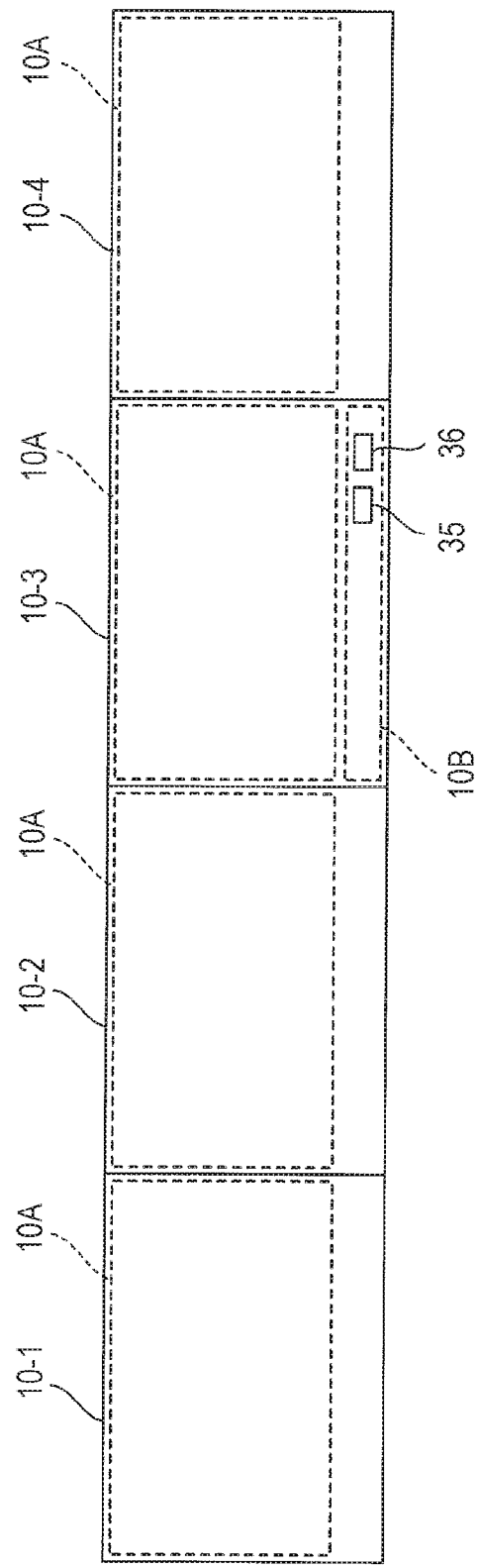
FIG. 2 is a view illustrating arrangement of display devices in the configuration of the display system according to the first embodiment.

FIG. 1 is a block diagram illustrating a configuration of a display system according to a first embodiment. FIG. 2 is a view illustrating arrangement of display devices in the configuration of the display system according to the first embodiment.

As illustrated in FIG. 1, the display system according to the first embodiment includes a plurality of display devices 10, an input detection device 20, a control device 30, and an input instruction device 40.

Each of the plurality of display devices 10 is an LCD (Liquid Crystal Display) which is not illustrated. As illustrated in FIG. 2, the plurality of display devices 10 are arranged side by side in a horizontal direction. In the present embodiment, the plurality of display devices 10 are, for example, first to fourth display devices 10-1 to 10-4 as illustrated in FIGS. 1 and 2. Each of the first to fourth display devices 10-1 to 10-4 includes an image data display region 10A that serves as a display region on which image data is displayed.

Moreover, in the present embodiment, it is set that, for example, the third display device 10-3 among the first to fourth display devices 10-1 to 10-4 is a master display device and the other display devices 10-1, 10-2, and 10-4 are slave display devices. The master display device 10-3 is designated by a user, for example. Alternatively, the master display device 10-3 is designated in advance. The master display device 10-3 further includes a page operation display region 10B that serves as a display region on which a page operation unit which will be described below is displayed.

The input detection device 20 is a touch panel, and provided in the master display device 10-3. That is, the master display device 10-3 is used as a touch panel display with the use of the LCD and the input detection device 20 (touch panel)) which are included therein. When the user inputs a letter or the like to the image data display region 10A of the master display device 10-3 by using a fingertip or a pen point, the input detection device 20 detects the input by the user to the image data display region 10A of the master display device 10-3. Moreover, when the user performs an operation of the page operation unit, which will be described below, to the page operation display region 10B of the master display device 10-3, the input detection device 20 detects, as the operation of the page operation unit described below, the input by the user to the page operation display region 10B of the master display device 10-3.

Examples of the input detection device 20 include capacitance sensors and photosensors. The capacitance sensors are arranged in the LCD of the master display device 10-3 in matrix, for example, and detect a pointing medium (the pen point or the fingertip of the user) which comes close to the LCD with a predetermined distance or less therebetween. The photosensors are embedded in respective pixels of the LCD of the master display device 10-3 and thereby arranged in matrix, and detect a pointing medium (the pen point or the fingertip of the user) that is in contact with the LCD.

Examples of the input instruction device 40 include a keyboard and a pointing device such as a mouse.

As illustrated in FIG. 1, the control device 30 is connected to the first to fourth display devices 10-1 to 10-4 (the slave display device 10-1, the slave display device 10-2, the master display device 10-3, and the slave display device 10-4), the input detection device 20, and the input instruction device 40. The control device 30 includes a storage unit 31 and the control unit 32. The control unit 32 is a CPU (Central Processing Unit), and controls the input detection device 20 and the first to fourth display devices 10-1 to 10-4. The storage unit 31 stores a computer program therein, and the control unit 32 executes the computer program. In a case where the user operates the input instruction device 40, the control unit 32 executes the computer program in accordance with the operation of the input instruction device 40.

As illustrated in FIG. 1, the control unit 32 includes an image data display control unit 33, an input reflection display control unit 34, and a page operation unit.

The image data display control unit 33 displays, on each of the first to fourth display devices 10-1 to 10-4, among image data of a plurality of pages, each of image data of the number corresponding to the number of the first to fourth display devices 10-1 to 10-4 (the slave display device 10-1, the slave display device 10-2, the master display device 10-3, and the slave display device 10-4).

The input reflection display control unit 34 reflects input information that indicates information which is input by the user to image data displayed on the master display device 10-3 of the image data of the number of display devices 10.

As illustrated in FIGS. 1 and 2, the page operation unit includes an operation unit for page feeding 35 and an operation unit for page returning 36. The operation unit for page feeding 35 is an operation unit by which page feeding is performed to the image data of the number of display devices 10, which is displayed on the first to fourth display devices 10-1 to 10-4 (the slave display device 10-1, the slave display device 10-2, the master display device 10-3, and the slave display device 10-4). The operation unit for page returning 36 is an operation unit by which page returning is performed to the image data of the number of display devices 10, which is displayed on the first to fourth display devices 10-1 to 10-4 (the slave display device 10-1, the slave display device 10-2, the master display device 10-3, and the slave display device 10-4). As illustrated in FIG. 2, the page operation unit (the operation unit for page feeding 35 and the operation unit for page returning 36) is displayed in the page operation display region 10B of the master display device 10-3.

When the page operation unit (the operation unit for page feeding 35 or the operation unit for page returning 36) is operated, the image data display control unit 33 displays, on each of the first to fourth display devices 10-1 to 10-4 (the slave display device 10-1, the slave display device 10-2, the master display device 10-3, and the slave display device 10-4), among the image data of the plurality of pages, each of image data which is obtained by shifting the image data of the number of display devices 10 in accordance with the operation on the page operation unit (the operation unit for page feeding 35 or the operation unit for page returning 36).

Moreover, in a case where the input instruction device 40 is a keyboard, a shift key for page feeding (not illustrated) corresponding to the operation unit for page feeding 35 and a shift key for page returning (not illustrated) corresponding to the operation unit for page returning 36 are provided therein.

Also in a case where the shift key (the shift key for page feeding or the shift key for page returning) of the input instruction device 40 is operated instead of the page operation unit, the image data display control unit 33 displays, on each of the first to fourth display devices 10-1 to 10-4 (the slave display device 10-1, the slave display device 10-2, the master display device 10-3, and the slave display device 10-4), among the image data of the plurality of pages, each of image data which is obtained by shifting the image data of the number of display devices 10 in accordance with the operation on the shift key (the shift key for page feeding or the shift key for page returning) of the input instruction device 40.

Figure 3:
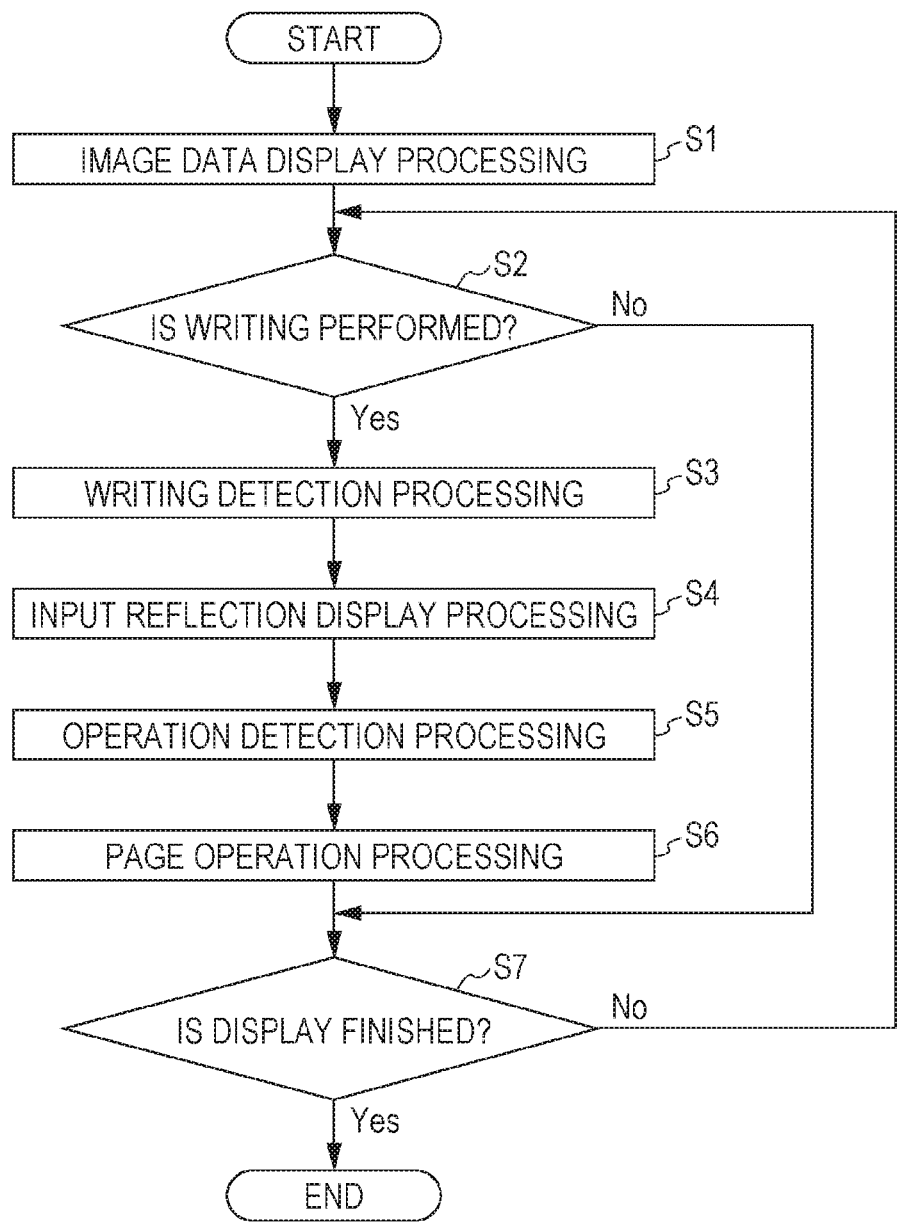
FIG. 3 is a flowchart illustrating an operation (display processing) of the display system according to the first embodiment.

Next, an operation (display processing) of the display system according to the first embodiment will be described by using FIGS. 3 to 10. FIG. 3 is a flowchart illustrating the operation (display processing) of the display system according to the first embodiment. Each of FIGS. 4 to 10 is a view illustrating image data displayed on the display devices in the operation of the display system according to the first embodiment.

For example, a user (teacher) uses image data of a plurality of pages as a teaching material to be used in a class for a viewer (student). The image data of the plurality of pages is stored in the storage unit 31 of the control device 30. Alternatively, the image data of the plurality of pages is input to the control device 30, and the control unit 32 of the control device 30 stores the image data of the plurality of pages in the storage unit 31.

Figure 6:
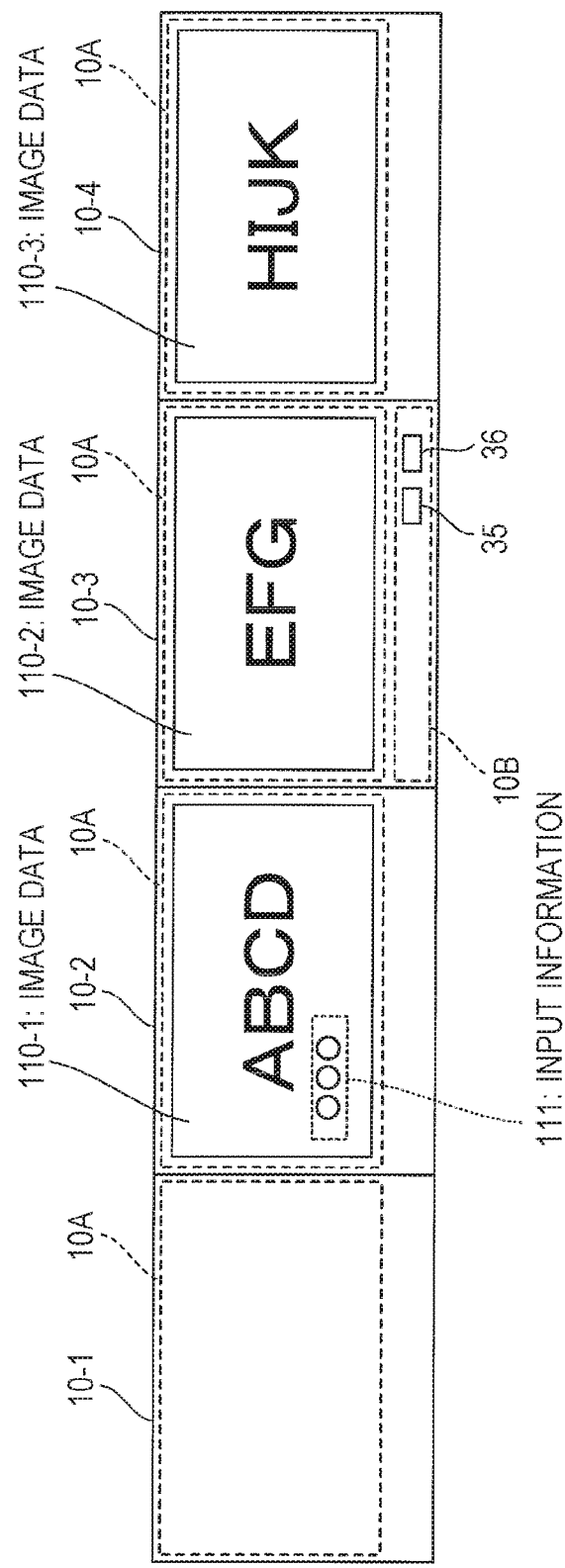
FIG. 6 is a view illustrating image data displayed on the display devices is the operation of the display system according to the first embodiment.
Figure 7:
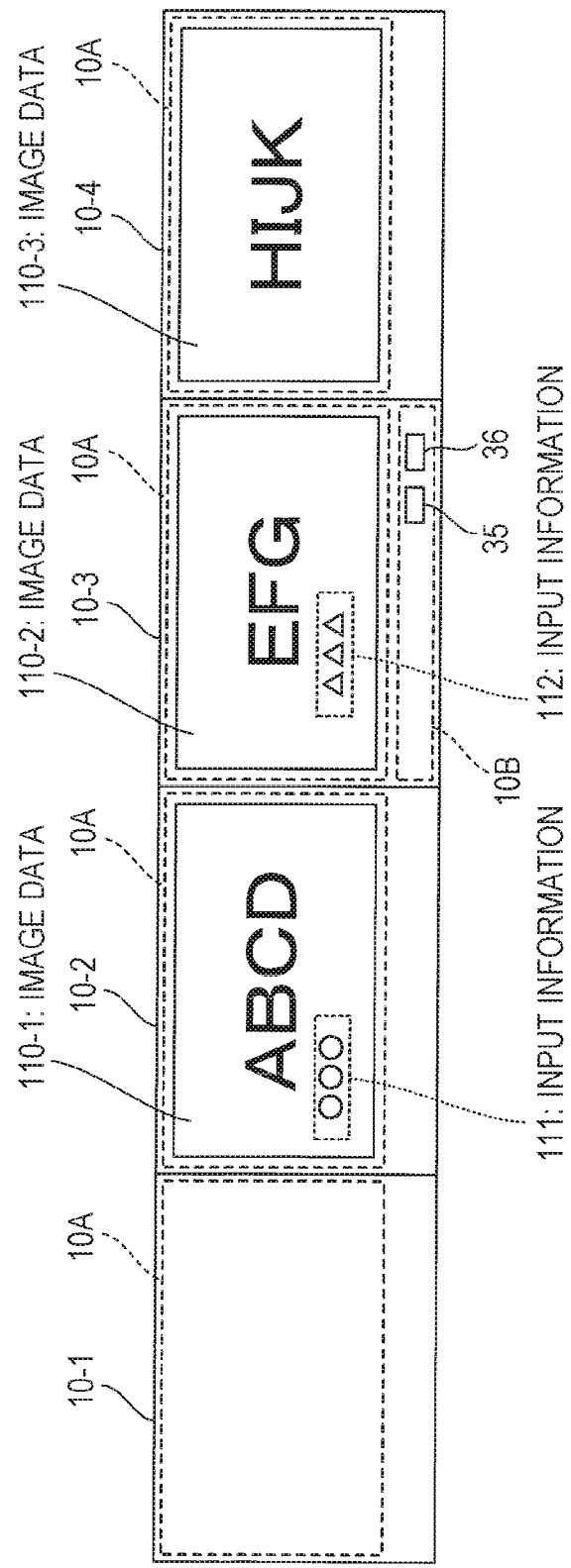
FIG. 7 is a view illustrating image data displayed on the display devices in the operation of the display system according to the first embodiment.
Figure 8:
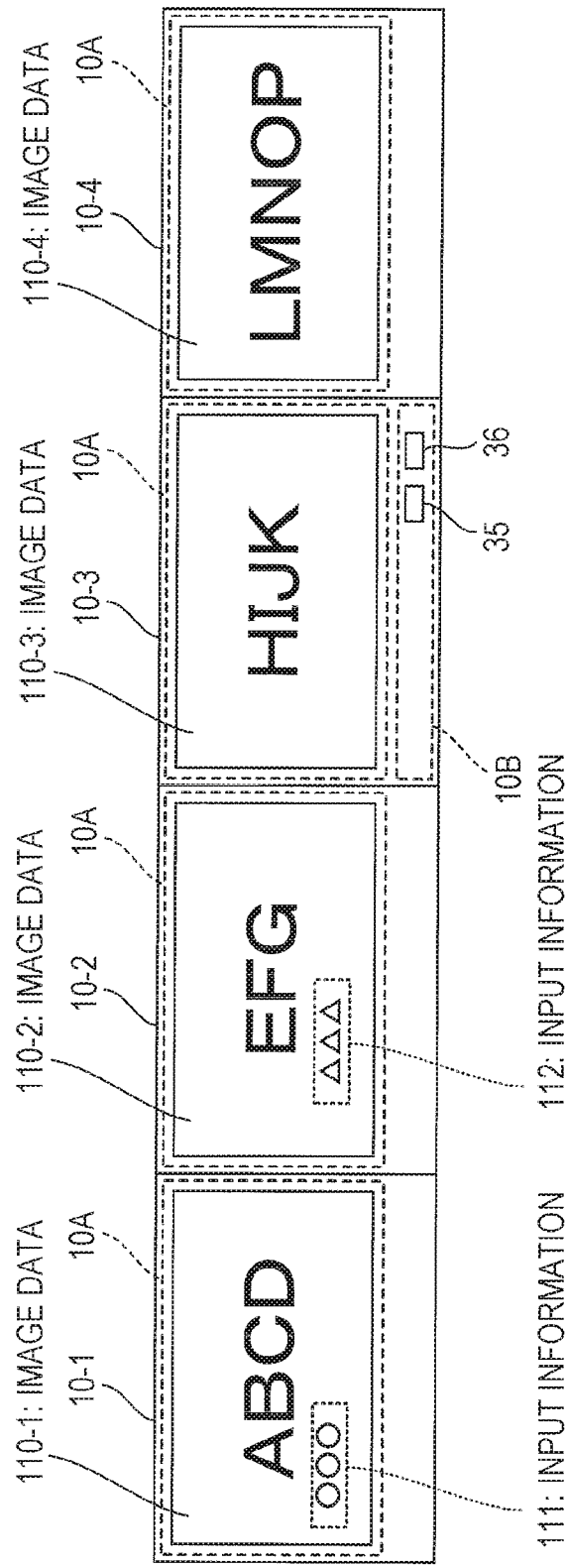
FIG. 8 is a view illustrating image data displayed on the display devices in the operation of the display system according to the first embodiment.
Figure 9:
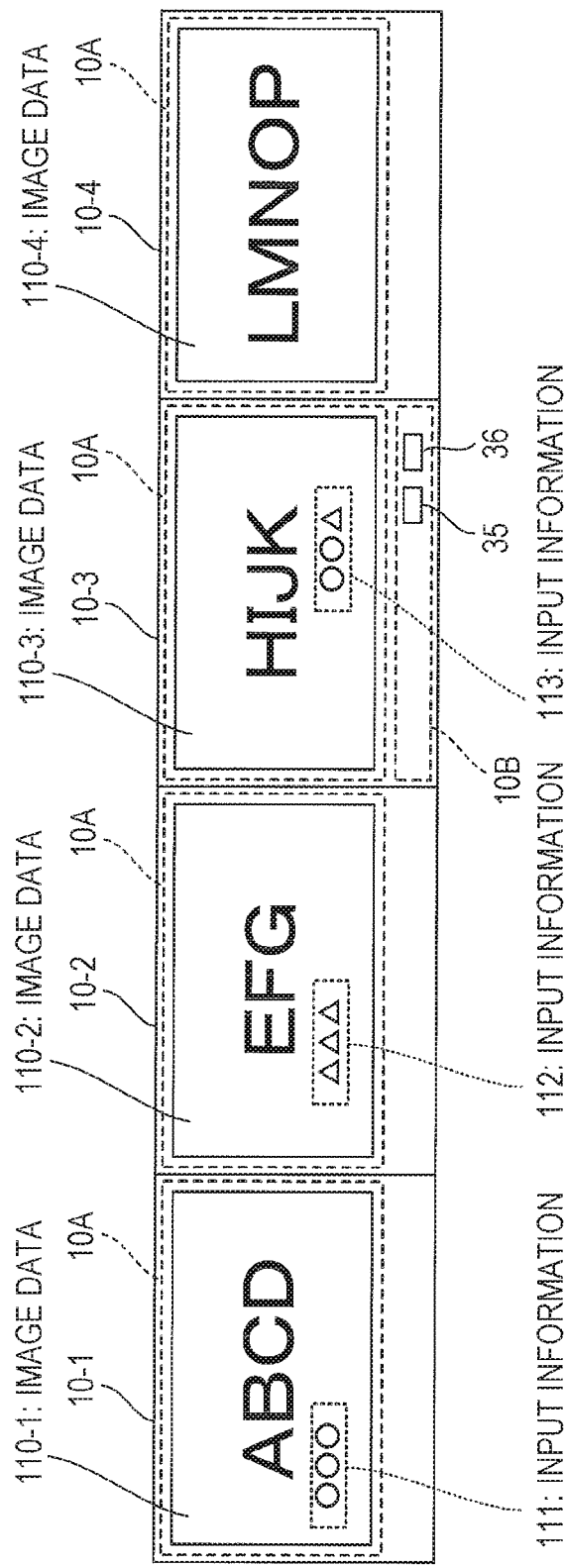
FIG. 9 is a view illustrating image data displayed on the display devices in the operation of the display system according to the first embodiment.
Figure 10:
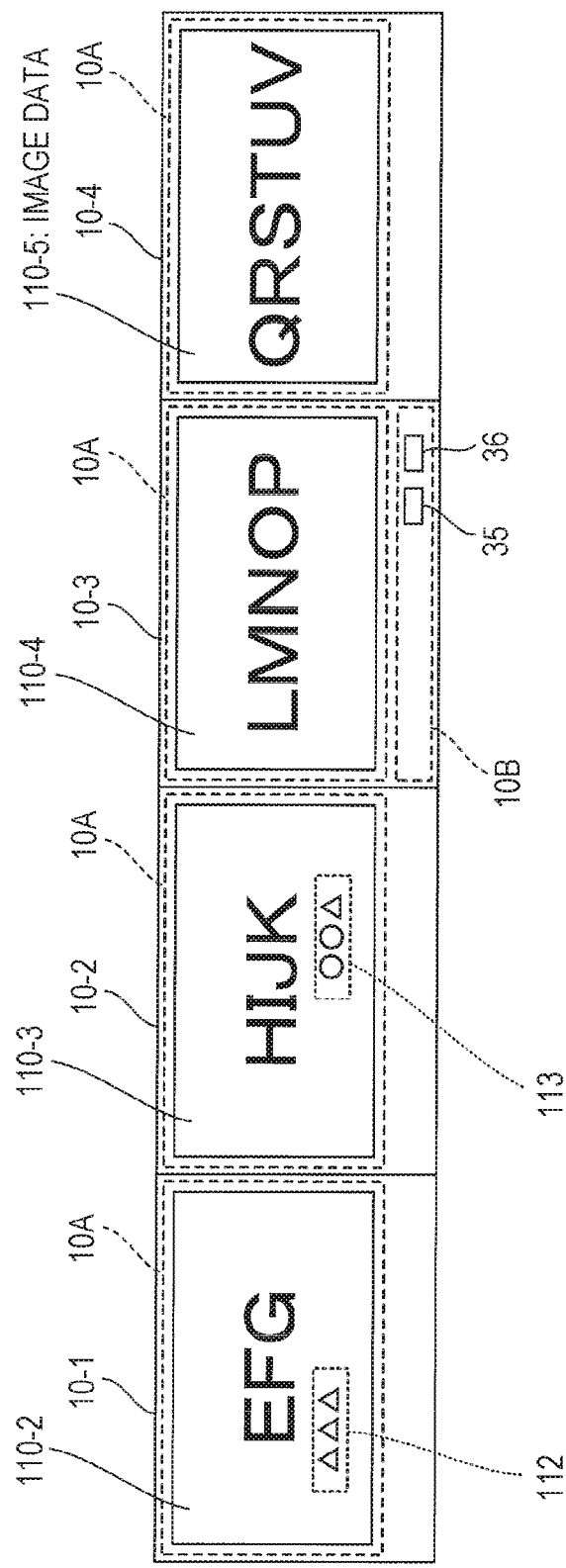
FIG. 10 is a view illustrating image data displayed on the display devices in the operation of the display system according to the first embodiment.

As illustrated in FIGS. 4 to 9, image data of a first page 110-1 of the image data of the plurality of pages represents letters of "ABCD" which are horizontally written in alphabetical letters. As illustrated in FIGS. 4 to 10, image data of a second page 110-2 of the image data of the plurality of pages represents letters of "EFG" which are horizontally written in alphabetical letters. As illustrated in FIGS. 6 to 10, image data of a third page 110-3 of the image data of the plurality of pages represents letters of "HIJK" which are horizontally written in alphabetical letters. As illustrated in FIGS. 8 to 10, image data of a fourth page 110-4 of the image data of the plurality of pages represents letters of "LMNOP" which are horizontally written in alphabetical letters. As illustrated in FIG. 10, image data of a fifth page 110-5 of the image data of the plurality of pages represents letters of "QRSTUV" which are horizontally written in alphabetical letters.

Figure 4:
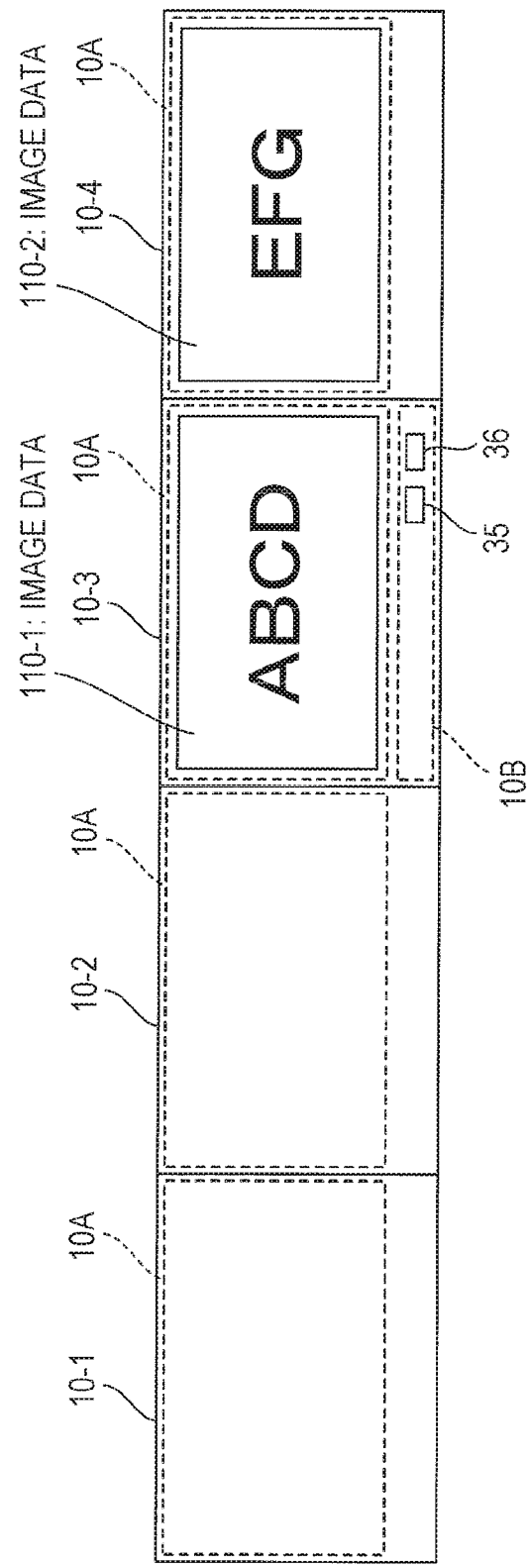
FIG. 4 is a view illustrating image data displayed on the display devices in the operation of the display system according to the first embodiment.

First, the user operates the input instruction device 40 to give a display instruction for displaying the image data of the first and second pages 110-1 of "ABCD" and 110-2 of "EFG" (refer to FIG. 4) of the image data of the plurality of pages, which is stored in the storage unit 31 of the control device 30. At this time, as illustrated in FIG. 4, the image data display control unit 33 of the control unit 32 of the control device 30 displays the image data of the first page 110-1 of "ABCD" and the image data of the second page 110-2 of "EFG" of the image data of the plurality of pages on the master display device 10-3 and the slave display device 10-4, respectively (step S1 of FIG. 3; image data display processing.

In a case where the user does not perform input to the image data display region 10A of the master display device 10-3 for a fixed time or more (No at step S2 of FIG. 3), the operation (display processing) of the display system according to the first embodiment moves to step S7 described below.

Otherwise, the user inputs a letter or the like with a fingertip or a pen point to the image data display region 10A of the master display device 10-3 within the fixed time (Yes at step S2 of FIG. 3). At this time, the input detection device 20 detects the input performed by the user to the image data display region 10A of the master display device 10-3, and generates input information 111 (refer to FIG. 5) (step S3 of FIG. 3; writing detection processing). The input information 111 represents, as information input by the user, an explanatory note accompanying the image data (in this case, the image data of the first page 110-1 of "ABCD") which is displayed on the master display device 10-3.

Figure 5:
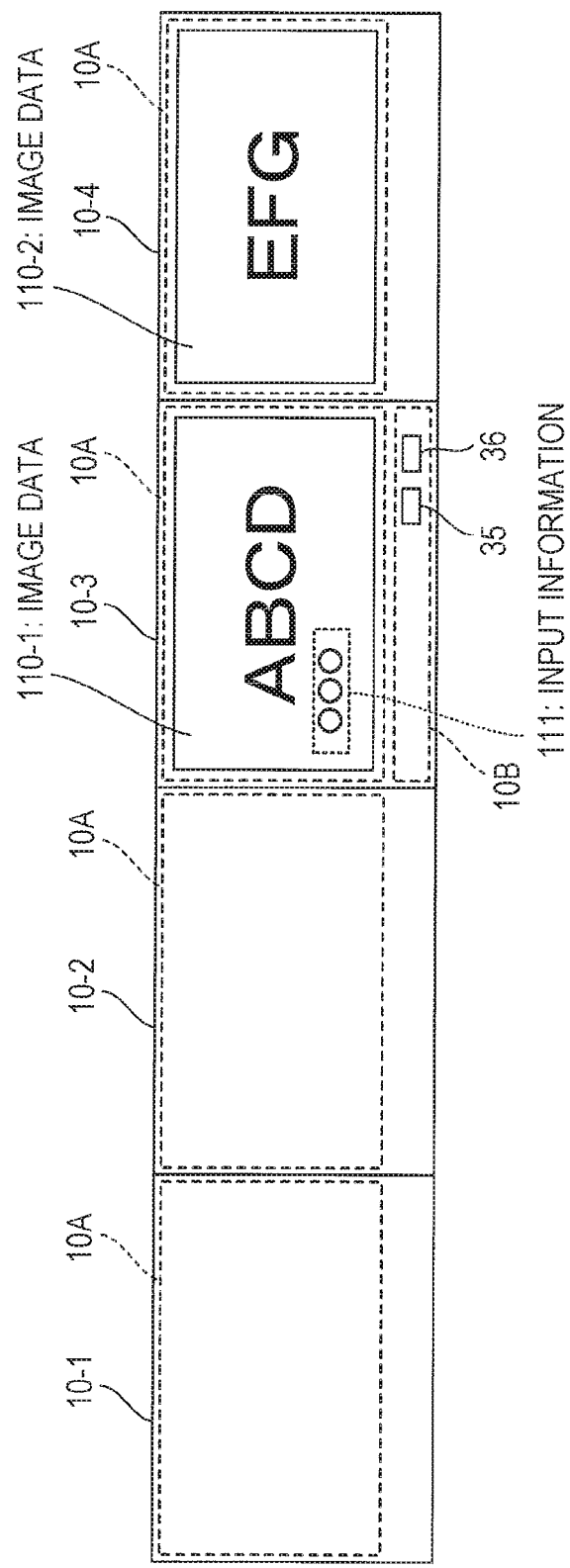
FIG. 5 is a view illustrating image data displayed on the display devices in the operation of the display system according to the first embodiment.

As illustrated in FIG. 5, the input reflection display control unit 34 reflects the input information 111 (explanatory note) on the image data (in this case, the image data of the first page 110-1 of "ABCD") of the image data of the first and second pages 110-1 of "ABCD" and 110-2 of "EFG", which is displayed on the master display device 10-3 (step S4 of FIG. 3; input reflection display processing).

For example, the user performs as operation on (presses) the operation unit for page feeding 35 only once to the page operation display region 10B of the master display device 10-3. At this time, the input detection device 20 detects, as the operation on the operation unit for page feeding. 35, the input performed by the user to the page operation display region 10B of the master display device 10-3, and transmits a shift instruction to the control unit 32 of the control device 30 (step S5 of FIG. 3; operation detection processing). The shift instruction indicates page feeding of one time.

As illustrated in FIG. 6, in response to the shift instruction from the operation unit for page feeding 35, the image data display control unit 33 of the control unit 32 displays, on each of the second to fourth display devices 10-2 to 10-4, among the image data of the plurality of pages, each of image data which is obtained by page feeding of the image data of the first and second pages 110-1 of "ABCD" and 110-2 of "EFG" by one page. That is, in response to the shift instruction, the image data display control unit 33 displays, of the image data of the plurality of pages, the image data of the first page 110-1 of "ABCD" on which the input information 111 (explanatory note) is reflected, the image data of the second page 110-2 of "EFG", and the image data of the third page 110-3 of "HIJK" on the slave display device 10-2, the master display device 10-3, and the slave display device 10-4, respectively (step S6 of FIG. 3; page operation processing).

In the above-described example, display of all pages is not finished, so that display of image data is not finished (No at step 67), and step S2 described above is performed.

Next, the user inputs a letter or the like with the fingertip or the pen point to the image data display region 10A of the master display device 10-3 within the fixed time (Yes at step S2 of FIG. 3). At this time, the input detection device 20 detects the input performed by the user to the image data display region 10A of the master display device 10-3, and generates input information 112 (refer to FIG. 7) (step S3 of FIG. 3; writing detection processing). The input information 112 represents, as information input by the user, an explanatory note accompanying the image data (in this case, the image data of the second page 110-2 of "EFG") which is displayed on the master display device 10-3.

As illustrated in FIG. 7, the input reflection display control unit 34 reflects the input information 112 (explanatory note) on the image data (in this case, the image data of the second page 110-2 of "EFG") of the image data of the first to third pages 110-1 of "ABC D", 110-2 of "EFG", and 110-3 of "HIJK", which is displayed on the master display device 10-3 (step S4 of FIG. 3; input reflection display processing).

For example, the user performs an operation on (presses) the operation unit for page feeding 35 only once to the page operation display region 10B of the master display device 10-3. At this time, the input detection device 20 detects, as the operation on the operation unit for page feeding 35, the input performed by the user to the page operation display region 10B of the master display device 10-3, and transmits a shift instruction to the control unit 32 of the control device 30 (step S5 of FIG. 3; operation detection processing).

As illustrated in FIG. 8, in response to the shift instruction from the operation unit for page feeding 35, the image data display control unit 33 of the control unit 32 displays, on each of the first to fourth display devices 10-1 to 10-4, among the image data of the plurality of pages, each of image data which is obtained by page feeding of the image data of the first to third pages 110-1 of "ABCD", 110-2 of "EFG", and 110-3 of "HIJK" by one page. That is, in response to the shift instruction, the image data display control unit 33 displays, of the image data of the plurality of pages, the image data of the first page 110-1 of "ABCD" on which the input information 111 (explanatory note) is reflected, the image data of the second page 110-2 of "EFG" on which the input information 112 (explanatory note) is reflected, the image data of the third page 110-3 of "HIJK", and the image data of the fourth page 110-4 of "LMNOP" on the slave display device 10-1, the slave display device 10-2, the master display device 10-3, and the slave display device 10-4, respectively (step S6 of FIG. 3; page operation processing).

In the above-described example, display of all pages is not finished, so that display of image data is not finished (No at step S7), and step S2 described above is performed.

Next, the user inputs a letter or the like with the fingertip or the pen point to the image data display region 10A of the master display device 10-3 within the fixed time (Yes at step S2 of FIG. 3). At this time, the input detection device 20 detects the input performed by the user to the image data display region 10A of the master display device 10-3, and generates input information 113 (refer to FIG. 9) (step S3 of FIG. 3; writing detection processing). The input information. 113 represents, as information input by the user, an explanatory note accompanying the image data (in this case, the image data of the third page 110-3 of "HIJK") which is displayed on the master display device 10-3.

As illustrated in FIG. 9, the input reflection display control unit 34 reflects the input information 113 (explanatory note) on the image data (in this case, the image data of the third page 110-3 of "HIJK") of the image data of the first to fourth pages 110-1 of "ABCD", 110-2 of "EFG", 110-3 of "HIJK", and 110-4 of "LMNOP", which is displayed on the master display device 10-3 (step S4 of FIG. 3; input reflection display processing).

For example, the user performs an operation on (presses) the operation unit for page feeding 35 only once to the page operation display region 10B of the master display device 10-3. At this time, the input detection device 20 detects, as the operation on the operation unit for page feeding 35, the input performed by the user to the page operation display region 10B of the master display device 10-3, and transmits a shift instruction to the control unit 32 of the control device 30 (step S5 of FIG. 3; operation detection processing).

As illustrated in FIG. 10, in response to the shift instruction from the operation unit for page feeding 35, the image data display control unit 33 of the control unit 32 displays, on each of the first to fourth display devices 10-1 to 10-4, among the image data of the plurality of pages, each of image data which is obtained by page feeding of the image data of the first to fourth pages 110-1 of "ABCD", 110-2 of "EFG", 110-3 of "HIJK", and 110-4 of "LMNOP" by one page. That is, in response to the shift instruction, the image data display control unit 33 displays, of the image data of the plurality of pages, the image data of the second page 110-2 of "EFG" on which the input information 112 (explanatory note) is reflected, the image data of the third page 110-3 of "HIJK" on which the input information 113 (explanatory note) is reflected, the image data of the fourth page 110-4 of "LMNOP", and the image data of the fifth page 110-5 of "QRSTUV" on the slave display device 10-1, the slave display device 10-2, the master display device 10-3, and the slave display device 10-4, respectively (step S6 of FIG. 3; page operation processing).

In a case where display of the image data of all pages is finished or in a case where display of the image data is to be finished (Yes at step S7), the operation (display processing) of the display system according to the first embodiment is finished. On the other hand, in a case where display of all pages is not finished or in a case where display of the image data is not to be finished (No at step S7), step S2 described above is performed.

As described above, the display system according to the first embodiment includes the plurality of display devices 10 (the slave display device 10-1, the slave display device 10-2, the master display device 10-3, and the slave display device 10-4) that are arranged side by side, the input detection device 20 that detects as input performed by a user to the master display device which is the display device 10 (the third display device 10-3) designated from the plurality of display devices 10 (the slave display device 10-1, the slave display device 10-2, the master display device 10-3, and the slave display device 10-4), and the control device 30 that is connected to the plurality of display devices 10 (the slave display device 10-1, the slave display device 10-2, the master display device 10-3, and the slave display device 10-4) and the input detection device 20, as illustrated in FIGS. 1 to 10. The control device 30 includes the image data display control unit 33 that displays, on each of the plurality of display devices 10 (the slave display device 10-1, the slave display device 10-2, the master display device 10-3, and the slave display device 10-4), among image data of a plurality of pages, each of image data of the number corresponding to the number of the plurality of display devices 10 (the slave display device 10-1, the slave display device 10-2, the master display device 10-3, and the slave display device 10-4) (for example, the image data of the first to fourth pages 110-1 of "ABCD", 110-2 of "EFG", 110-3 of "HIJK", and 110-4 of "LMNOP"), the input reflection display control unit 34 that reflects the input information 113 (explanatory note), which indicates information input by the user, on the image data 110-3 of "HIJK" of the image data of the number of display devices 10 (the image data of the first to fourth pages 110-1 of "ABCD", 110-2 of "EFG", 110-3 of "HIJK", and 110-4 of "LMNOP"), which is displayed on the master display device 10-3, and the page operation unit (the operation unit for page feeding 35 and the operation unit for page returning 36) by which page feeding or page returning is performed to the image data of the number of display devices 10 (the image data of the first to fourth pages 110-1 of "ABCD", 110-2 of "EFG", 110-3 of "HIJK", and 110-4 of "LMNOP"), which is displayed on the plurality of display devices 10 (the slave display device 10-1, the slave display device 10-2, the master display device 10-3, and the slave display device 10-4). When the page operation unit (the operation unit for page feeding 35 or the operation unit for page returning 36) is operated, the image data display control unit 33 displays, on each of the plurality of display devices 10 (the slave display device 10-1, the slave display device 10-2, the master display device 10-3, and the slave display device 10-4), among the image data of the plurality of pages, each of image data (in a case of page feeding, the image data of the second to fifth pages 110-2 of "EFG", 110-3 of "HIJK", 110-4 of "LMNOP", and 110-5 of "QRSTUV") which is obtained by shifting the image data of the number of display devices 10 (the image data of the first to fourth pages 110-1 of "ABCD", 110-2 of "EFG", 110-3 of "HIJK", and 110-4 of "LMNOP") in accordance with the operation on the page operation unit (the operation unit for page feeding 35 or the operation unit for page returning 36).

In this manner, in the display system according to the first embodiment, each of image data of the number of display devices 10 (the image data of the first to fourth pages 110-1 of "ABCD", 110-2 of "EFG", 110-3 of "HIJK", and 110-4 of "LMNOP") of the image data of the plurality of pages is displayed on each of the plurality of display devices 10 (the slave display device 10-1, the slave display device 10-2, the master display device 10-3, and the slave display device 10-4), so that a viewer is able to view the image data of the first to fourth pages 110-1 of "ABCD", 110-2 of "EFG", 110-3 of "HIJK", and 110-4 of "LMNOP", that is, image data of several pages at once.

Moreover, in the display system according to the first embodiment, since each of image data (in a case of page feeding, the image data of the second to fifth pages 110-2 of "EFG", 110-3 of "HIJK", 110-4 of "LMNOP", and 110-5 of "QRSTUV") which has been shifted in accordance with an operation on the page operation unit (the operation unit for page feeding 35 or the operation unit for page returning 36) is displayed on each of the plurality of display devices 10 (the slave display device 10-1, the slave display device 10-2, the master display device 10-3, and the slave display device 10-4), the viewer is able to view the image data of the second to fifth pages 110-2 of "EFG", 110-3 of "HIJK", 110-4 of "LMNOP", and 110-5 of "QRSTUV", that is, image data of several pages at once.

In addition, in the display system according to the first embodiment, even when the image data (the image data of the first to fourth pages 110-1 of "ABCD", 110-2 of "EFG", 110-3 of "HIJK", and 110-4 of "LMNOP") is shifted in accordance with the operation on the page operation unit (the operation unit for page feeding 35 or the operation unit for page returning 36) after the user reflects the input information 113 (explanatory note) on the image data 110-3 of "HIJK" which is displayed on the master display device 10-3, the image data 110-3 of "HIJK" on which the input information 113 (explanatory note) is reflected is displayed on the display device 10 (in a case of page feeding, the slave display device 10-2, and, in a case of page returning, the slave display device 10-4), so that the viewer is able to view information (input information 113) input by the user even when image data of a target page is shifted backward or forward (in this case, in a right or left direction).

Furthermore, in the display system according to the first embodiment, in a case where the image data of the number of display devices 10 (the image data of the first to fourth pages 110-1 of "ABCD", 110-2 of "EFG", 110-3 of "HIJK", and 110-4 of "LMNOP") is subjected to page feeding, the input information representing the explanatory note (in this case, the input information 112 and 113) is reflected on, of the image data of the plurality of pages, image data (in this case, the image data of the second and third pages 110-2 "EFG" and 110-3 "HIJK") of a page previous to the image data (in this case, the image data of the fourth page 110-4 of "LMNOP") displayed on the master display device 10-3.

In this manner, in the display system according to the first embodiment, the user is able to reflect the input information 113 (explanatory note) on the image data 110-3 of "HIJK" displayed on the master display device 10-3, and further able to reflect the input information 112 and 113 (explanatory notes) on the image data (in this case, the image data of the second and third pages 110-2 of "EFG" and 110-3 of "HIJK") of the pages previous to the image data (in this case, the image data of the fourth page 110-4 of "LMNOP") displayed on the master display device 10-3 even when the image data (the image data of the first to fourth pages 110-1 of "ABCD", 110-2 of "EFG", 110-3 of "HIJK", and 110-4 of "LMNOP") is shifted in accordance with the operation on the page operation unit (the operation unit for page feeding 35 or the operation unit for page returning 36).

In PTLs 1 and 2, image data same as image data on which input information is reflected is displayed on another screen by using the screen capturer, but, in the display system according to the first embodiment, the image data 110-1 of "ABCD", 110-2 of "EFG", and 110-3 of "HIJK", on which input information 111, 112, and 113 (explanatory notes) is reflected, respectively, are shifted without using any screen capturer. Thus, the viewer is able to view information (input information 111, 112, 113) input by a user even when image data of a target page is shifted backward or forward (in this case, in a right or left direction).

Moreover, in the display system according to the first embodiment, each of the plurality of display devices 10 (the slave display device 10-1, the slave display device 10-2, the master display device 10-3, and the slave display device 10-4) includes the image data display region 10A on which image data is displayed. In this case, the input detection device 20 detects, as the input information 113, an input performed by the user to the image data display region 10A of the master display device 10-3. Then, in order to improve operability when the user is giving an explanation to the viewer, it is preferable that the master display device 10-3 among the plurality of display devices 10 further includes the page operation display region 10B that serves as a display region on which the page operation unit (the operation unit for page feeding 35 and the operation unit for page returning 36) is displayed. In this case, the input detection device 20 detects, as an operation on the page operation unit (the operation unit for page feeding 35 or the operation unit for page returning 36), an input performed by the user to the page operation display region 10B of the master display device 10-3.

In this manner, in the display system according to the first embodiment, a user is able to shift (perform page feeding or page returning for) image data, which is displayed on the plurality of display devices 10 (the slave display device 10-1, the slave display device 10-2, the master display device 10-3, and the slave display device 10-4), by performing an operation on the page operation unit (the operation unit for page feeding 35 or the operation unit for page returning 36) which is displayed on the page operation display region 10B of the master display device 10-3. Thereby, the user is able to smoothly give an explanation on image data of a plurality of pages.

Second Embodiment

In a second embodiment, a part changed from the first embodiment will be described.

Although one master display device (master display device 10-3) is included in the display system according to the first embodiment, there is no limitation thereto.

Figure 11:
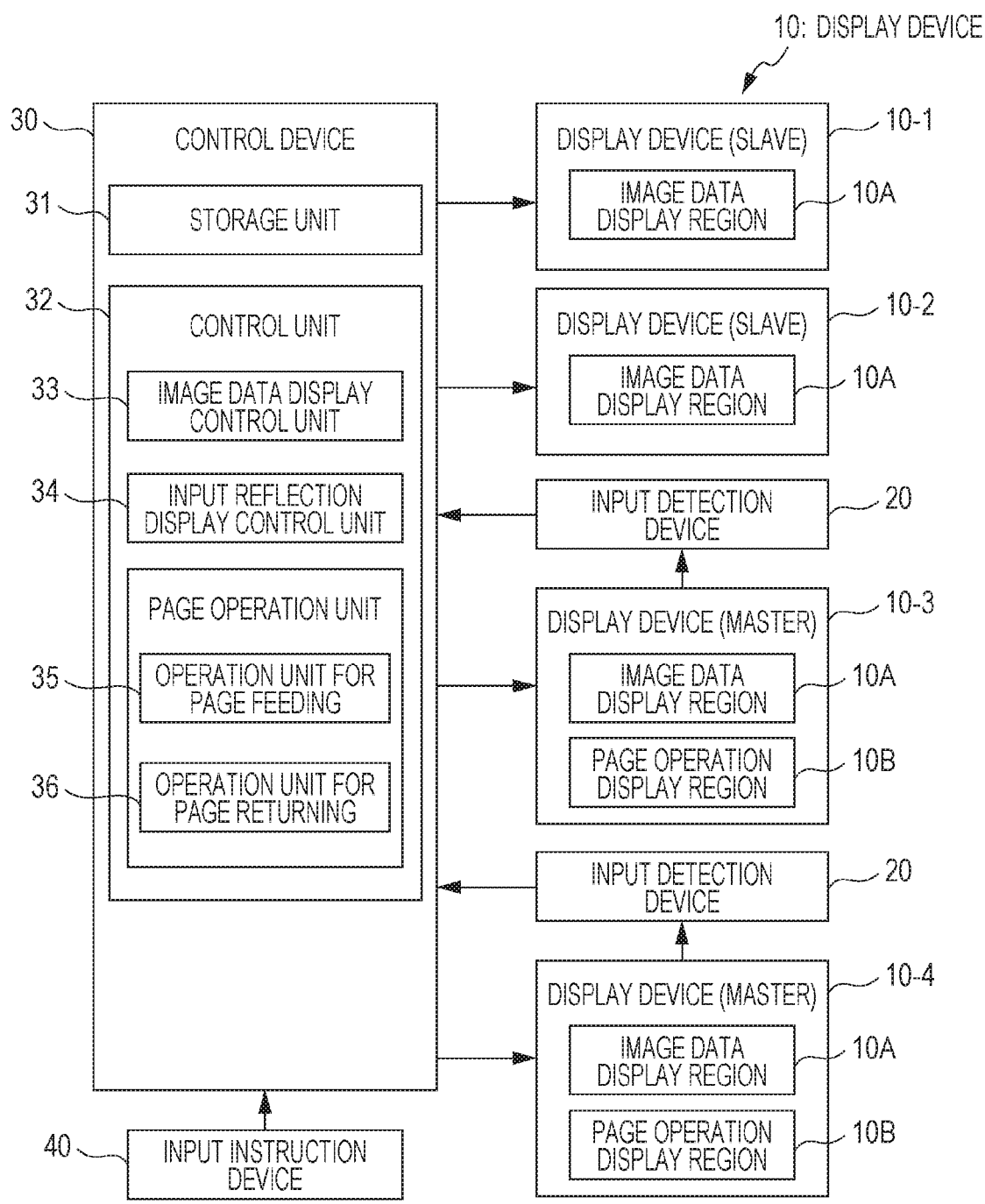
FIG. 11 is a block diagram illustrating a different configuration of a display system according to a second embodiment.
Figure 12:
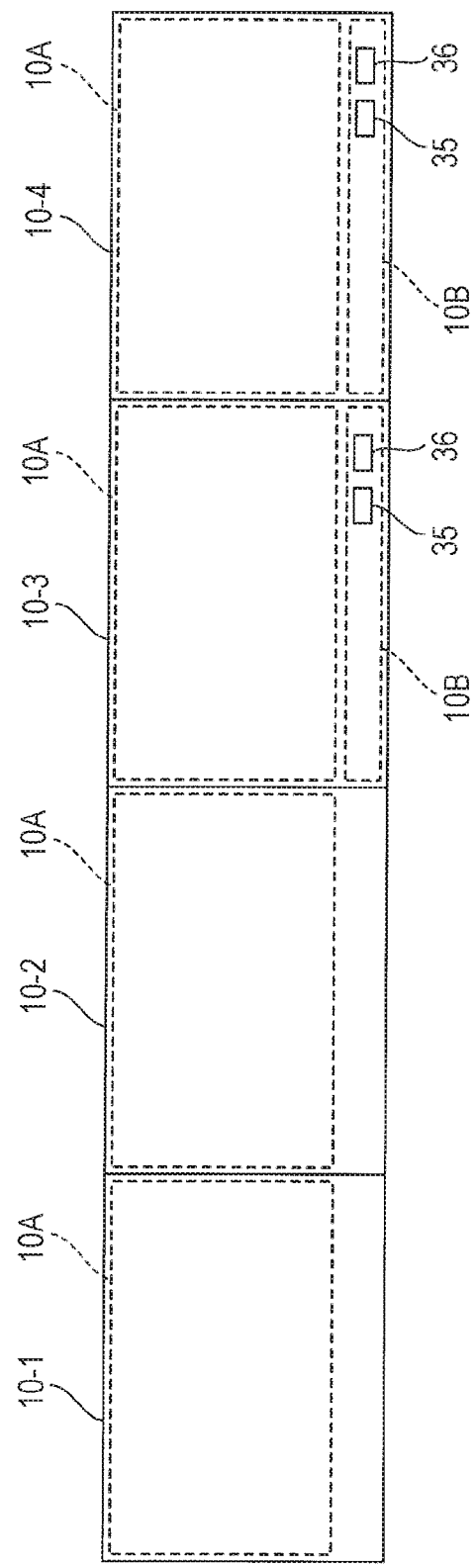
FIG. 12 is a view illustrating arrangement of display devices in the different configuration of the display system according to the second embodiment.

FIG. 11 is a block diagram illustrating a configuration of a display system according to the second embodiment. FIG. 12 is a view illustrating arrangement of display devices in the configuration of the display system according to the second embodiment.

In a case where there are N display devices as a plurality of display devices (in the above-described example, N=4), a plurality of display devices the number of which is smaller than N may be designated as master display devices. In a case where, for example, two master display devices are provided as illustrated in FIGS. 11 and 12, the display devices 10-3 and 10-4 of the plurality of display devices 10 are set as the master display devices.

In this manner, in the display system according to the second embodiment, for example, in a case where image data of a plurality of pages is composed of image data of spread pages each of which includes two pages, a user is able to smoothly give an explanation on the image data of the plurality of pages by using the two master display devices.

Third Embodiment

In a third embodiment, a part changed from the first and second embodiments will be described.

In the display system according to the first embodiment, in a case where letters of "ABCD . . . " represented by image data of a plurality of pages are horizontally written, the image data display control unit 33 displays, of the image data of the plurality of pages, image data of the number of display devices 10 (for example, the image data of the first to fourth pages 110-1 of "ABCD", 110-2 of "EFG", 110-3 of "HIJK", and 110-4 of "LMNOP"), which corresponds to the plurality of display devices 10 (the slave display device 10-1, the slave display device 10-2, the master display device 10-3, and the slave display device 10-4), on the plurality of display devices 10 (the slave display device 10-1, the slave display device 10-2, the master display device 10-3, and the slave display device 10-4) so as to be arrayed from a left side to a right side in order. However, there is no limitation thereto.

Figure 13:
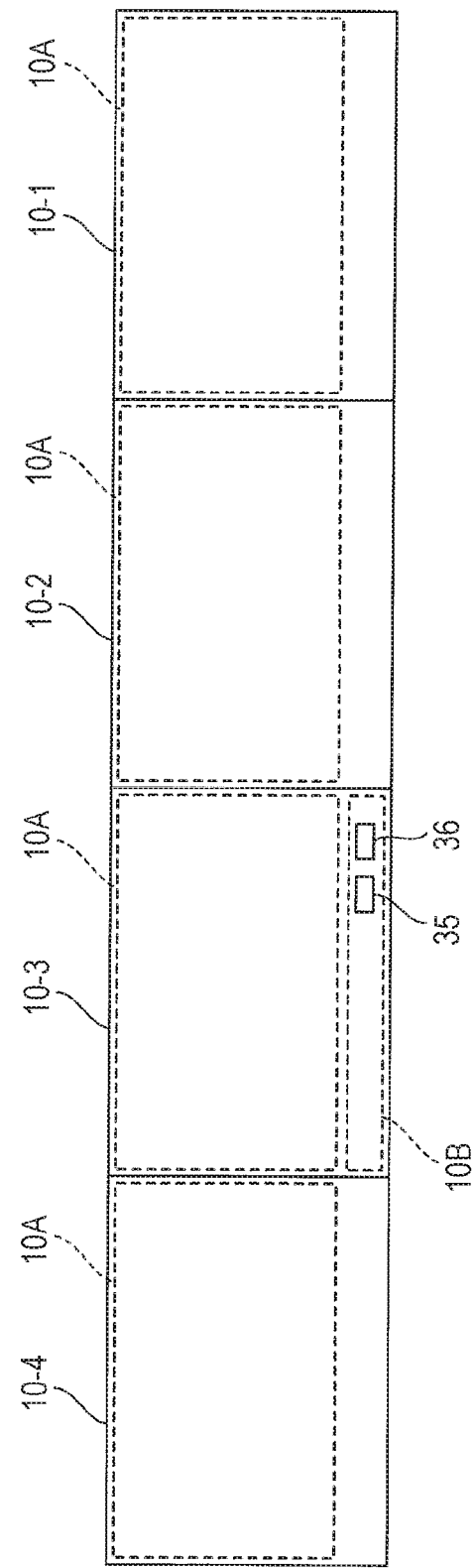
FIG. 13 is a view illustrating arrangement of display devices in a configuration of a display system according to a third embodiment.
Figure 14:
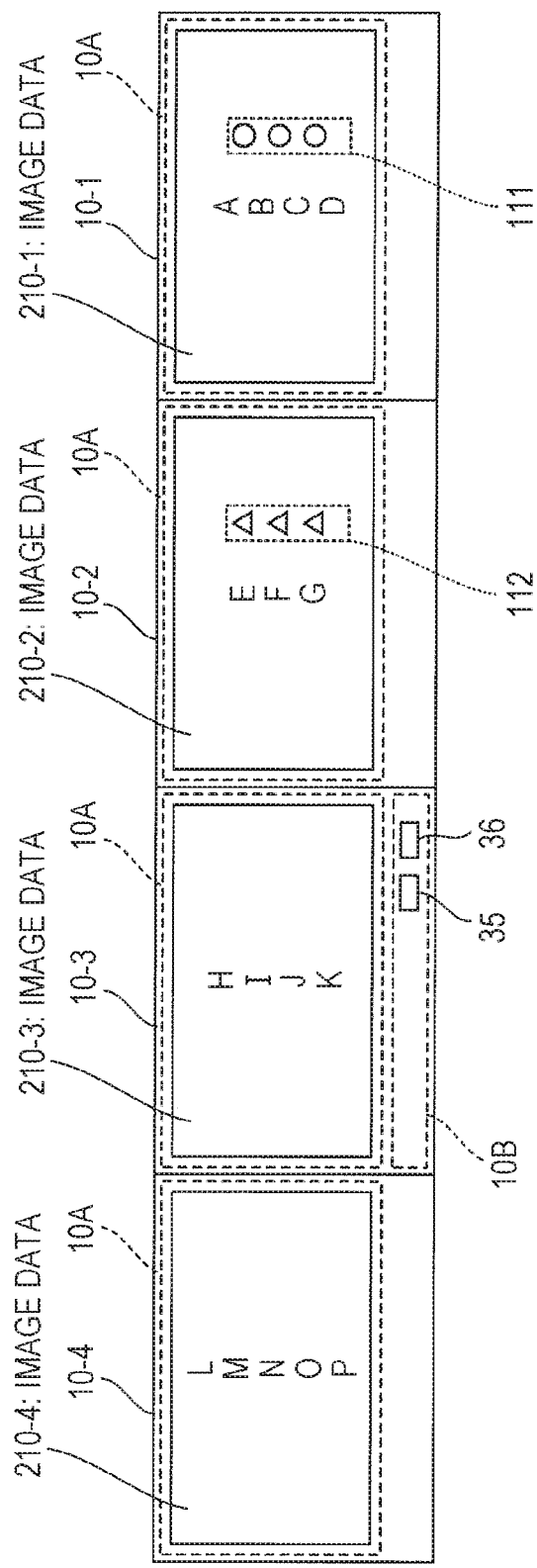
FIG. 14 is a view illustrating image data displayed on the display devices in an operation of the display system according to the third embodiment.

FIG. 13 is a view illustrating arrangement of display devices in a configuration of a display system according to the third embodiment. FIG. 14 is a view illustrating image data displayed on the display devices in an operation of the display system according to the third embodiment.

As illustrated in FIG. 14, image data of a first page 210-1 of image data of a plurality of pages represents letters of "ABCD" which are vertically written in alphabetical letters. Image data of a second page 210-2 of the image data of the plurality of pages represents letters of "EFG" which are vertically written in alphabetical letters. Image data of a third page 210-3 of the image data of the plurality of pages represents letters of "HIJK" which are vertically written in alphabetical letters. Image data of a fourth page 210-4 of the image data of the plurality of pages represents letters of "LMNOP" which are vertically written in alphabetical letters.

In a case where the letters of "ABCDE . . . " represented by the image data of the plurality of pages are vertically written, among the image data of the plurality of pages, each of image data of the number corresponding to the number of the plurality of display devices 10 (the slave display device 10-1, the slave display device 10-2, the master display device 10-3, and the slave display device 10-4) (for example, the image data of the first to fourth pages 210-1 of "ABCD", 210-2 of "EFG", 210-3 of "HIJK", and 210-4 of "LMNOP") is displayed on each of the plurality of display devices 10 (the slave display device 10-1, the slave display device 10-2, the master display device 10-3, and the slave display device 10-4) so as to be arrayed from the right side to the left side in order. In this case, a direction for the array is designated by a user.

In this manner, in the display system according to the third embodiment, in accordance with a content of image data of a plurality of pages, a user is able to change a way of arraying the image data. For example, a user is able to display image data of the number of display devices 10 on the plurality of display devices 10 so as to be arrayed from the left side to the right side in order in an English class as the first embodiment, and is able to display image data of the number of display devices 10 on the plurality of display devices 10 so as to be arrayed from the right side to the left side in order in a Japanese class as the third embodiment.

Fourth Embodiment

Figure 15:
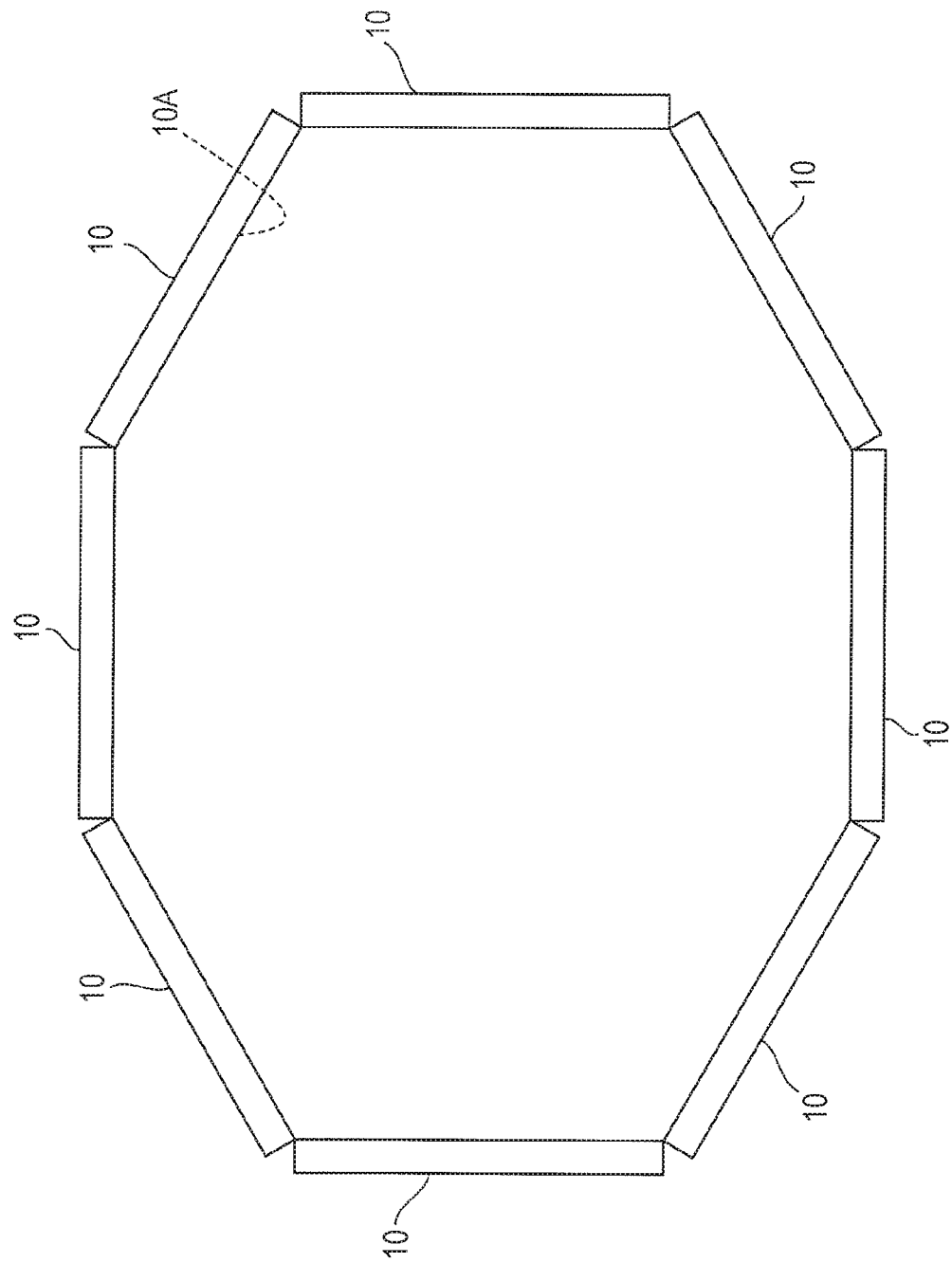
FIG. 15 is a view illustrating arrangement of display devices in a configuration of a display system according to a fourth embodiment.

FIG. 15 is a view illustrating arrangement of display devices in a configuration of a display system according to a fourth embodiment. In the fourth embodiment, a part changed from the first to third embodiments will be described.

In the display systems according to the first to third embodiments, the plurality of display devices 10 (for example, the slave display device 10-1, the slave display device 10-2, the master display device 10-3, and the slave display device 10-4 as illustrated in FIGS. 2, 4 to 10, and 14) are arranged so as to be arrayed in a horizontal direction. On the other hand, in the display system according to the fourth embodiment, the plurality of display devices 10 are arranged in a ring shape so that, when being viewed from above as illustrated in FIG. 15, each display surface (image data display region 10A) thereof serves as an inner peripheral surface.

In this manner, in the display system according to the fourth embodiment, depending on a content of image data of a plurality of pages, a user is able to array image data of a first page and image data of a last page of the image data of the plurality of pages next to each other.

Fifth Embodiment

Figure 16:
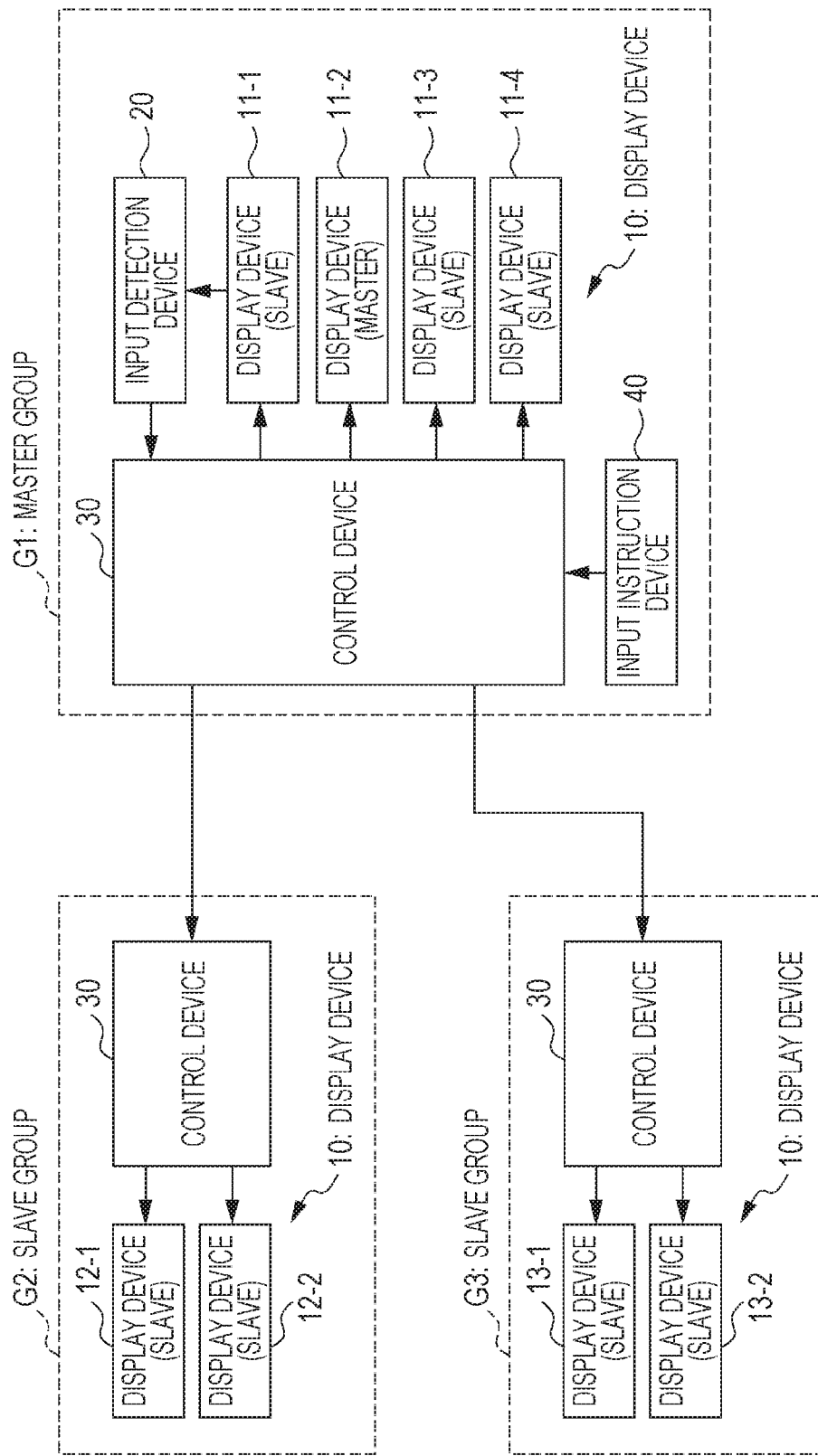
FIG. 16 is a block diagram illustrating a configuration of a display system according to a fifth embodiment.
Figure 17:
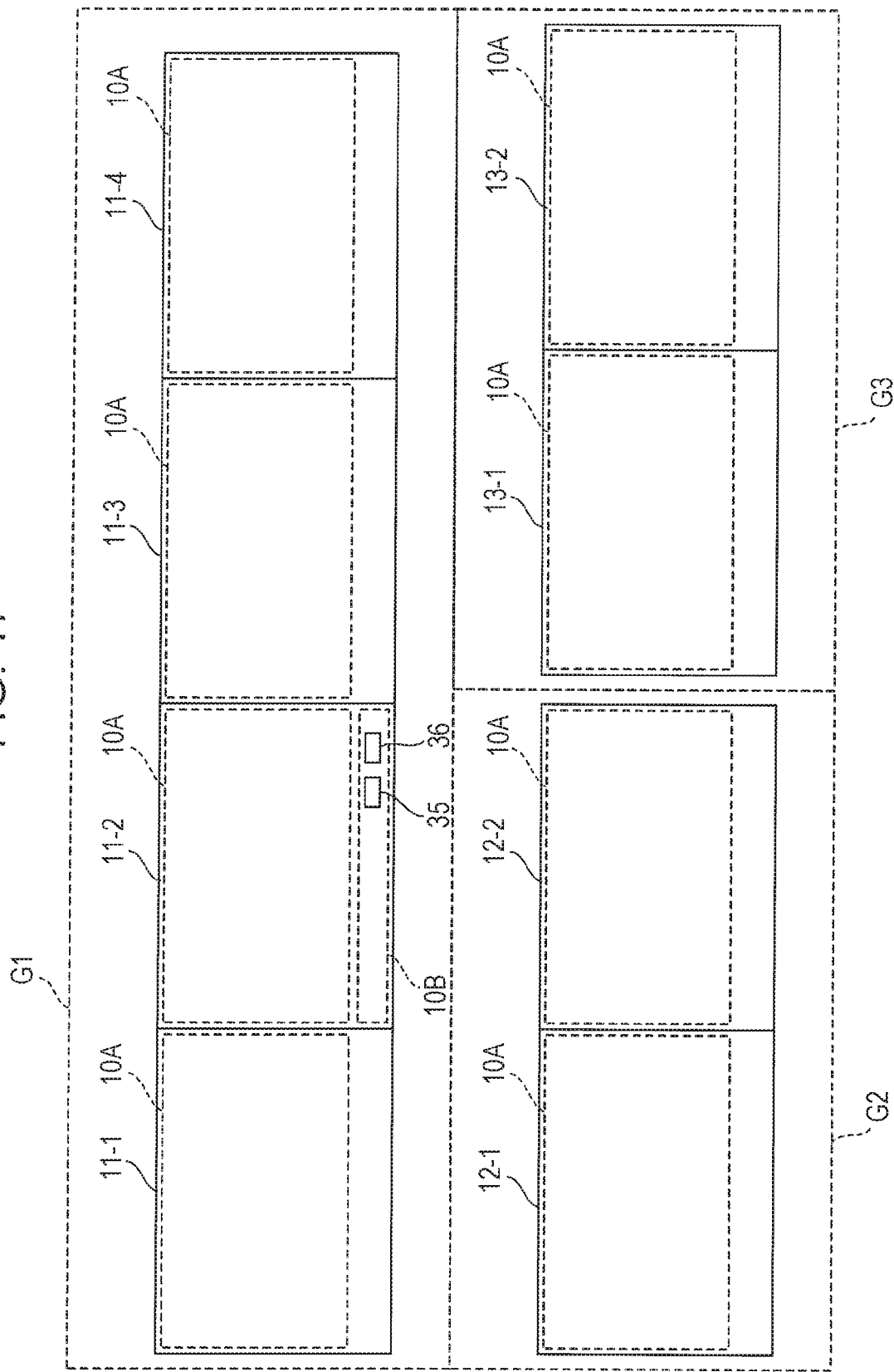
FIG. 17 is a view illustrating arrangement of display devices is the configuration of the display system according to the fifth embodiment.

FIG. 16 is a block diagram illustrating a configuration of a display system according to a fifth embodiment. FIG. 17 is a view illustrating arrangement of display devices in the configuration of the display system according to the fifth embodiment. In the fifth embodiment, a part changed from the first to fourth embodiments will be described.

In the display system according to the fifth embodiment, the plurality of display devices 10 and the control devices 30 are constituted by a plurality of groups G1 to G3. As illustrated in FIG. 16, in the present embodiment, the plurality of groups are the groups G1 to G3, for example. Moreover, in the present embodiment, the group G1 among the groups G1 to G3 is a master group, and the other groups G2 and G3 are slave groups. The master group G1 is designated, for example, by a user or designated in advance.

In this case, as illustrated in FIG. 16, the master group G1 includes a plurality of display devices 10, the input detection device 20, the control device 30, and the input instruction device 40. Since the input detection device 20, the control device 30, and the input instruction device 40 are similar to those of the first embodiment (refer to FIG. 1), description thereof will be omitted. In the present embodiment, the plurality of display devices 10 in the master group G1 are set to be, for example, first to fourth display devices 11-1 to 11-4. As illustrated in FIG. 17, each of the first to fourth display devices 11-1 to 11-4 includes the image data display region 10A which is similar to that of the first embodiment.

Moreover, in the present embodiment, for example, the first display device 11-2 among the first to fourth display devices 11-1 to 11-4 in the master group G1 is a master display device, and the other display devices 11-1, 11-3, and 11-4 are slave display devices. The master display device 11-1 is designated, for example, by a user or designated in advance. As illustrated in FIG. 17, the master display device 11-2 further includes the page operation display region 10B which is similar to that of the first embodiment.

In addition, as illustrated in FIG. 16, the slave group G2 includes a plurality of display devices 10 and the control device 30. In the present embodiment, the plurality of display devices 10 in the slave group G2 are set to be, for example, first and second display devices 12-1 and 12-2. As illustrated in FIG. 17, each of the first and second display devices 12-1 and 12-2 includes the image data display region 10A which is similar to that of the first embodiment.

Further, is the present embodiment, the first and second display devices 12-1 and 12-2 in the slave group G2 are slave display devices, for example.

In addition, as illustrated in FIG. 16, the slave group G3 includes a plurality of display devices 10 and the control device 30. In the present embodiment, the plurality of display devices 10 in the slave group G3 are set to be, for example, first and second display devices 13-1 and 13-2. As illustrated in FIG. 17, each of the first and second display devices 13-1 and 13-2 includes the image data display region 10A which is similar to that of the first embodiment.

Further, is the present embodiment, the first and second display devices 13-1 and 13-2 is the slave group G3 are slave display devices, for example.

Figure 18:
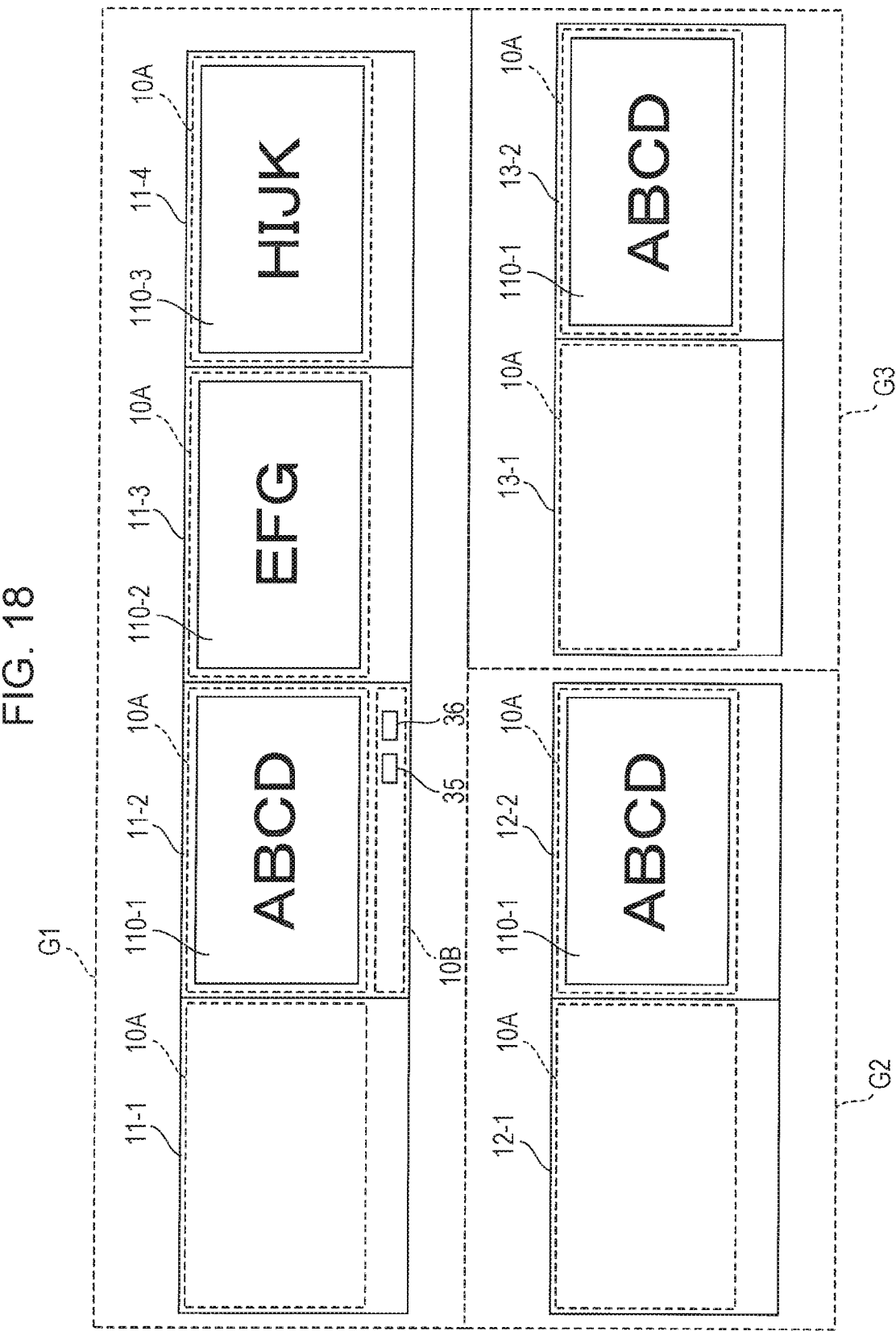
FIG. 18 is a view illustrating image data displayed on the display devices of each group in as operation of the display system according to the fifth embodiment.
Figure 19:
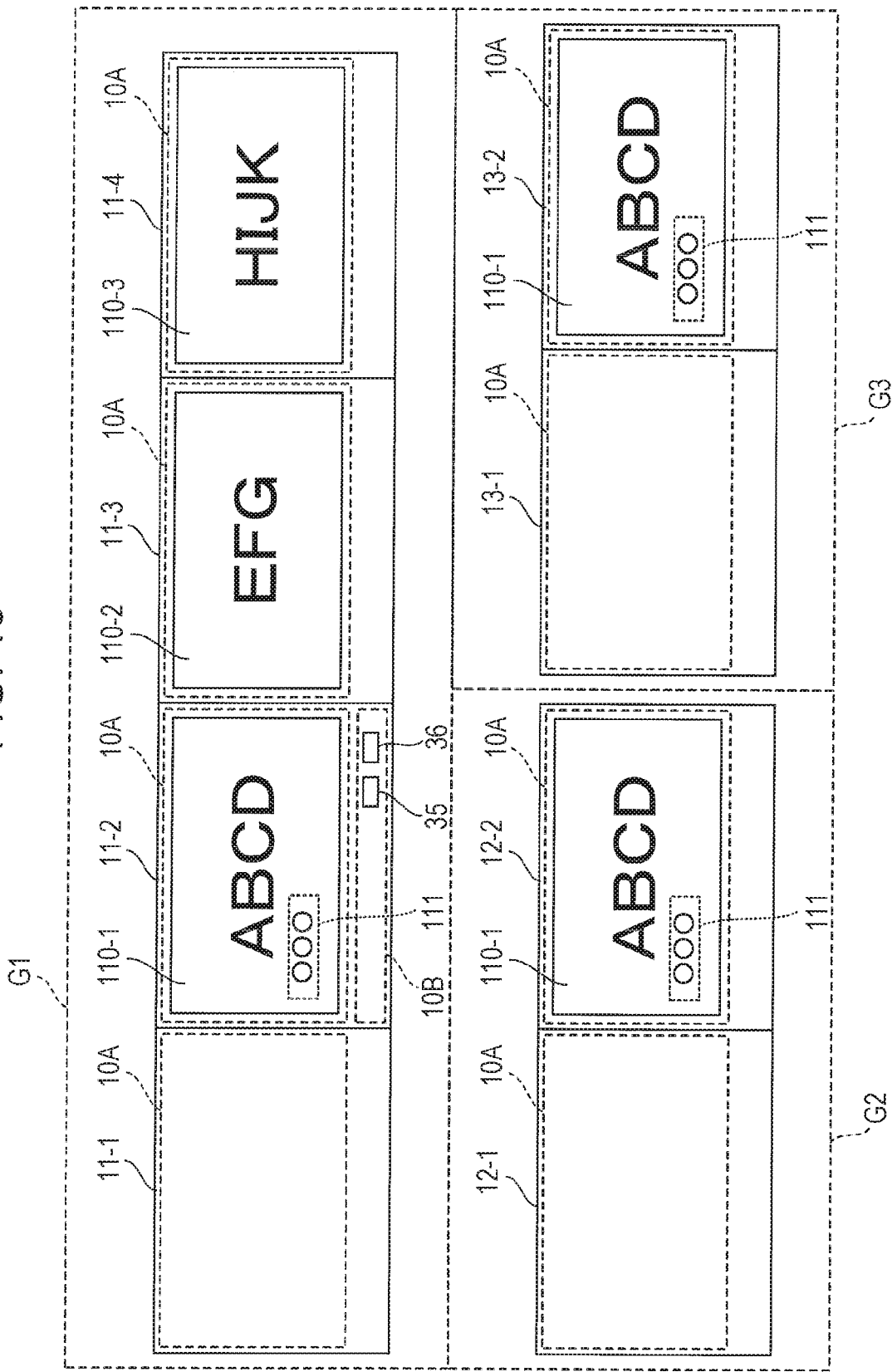
FIG. 19 is a view illustrating image data displayed on the display devices of each group in the operation of the display system according to the fifth embodiment.
Figure 20:
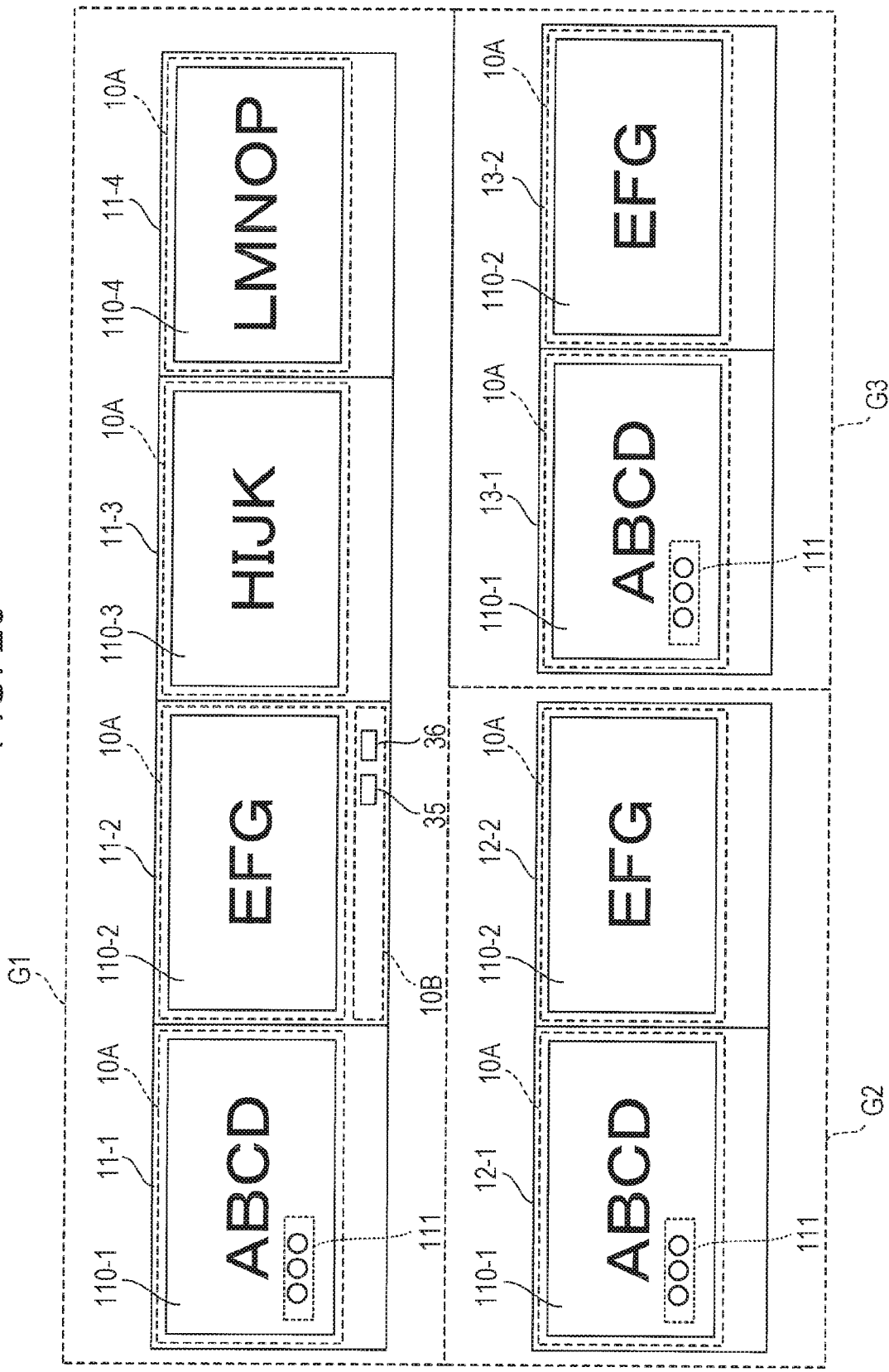
FIG. 20 is a view illustrating image data displayed on the display devices of each group in the operation of the display system according to the fifth embodiment.

Next, an operation (display processing) of the display system according to the fifth embodiment will be described by using FIG. 3 and FIGS. 18 to 20. FIGS. 18 to 20 are views each illustrating image data displayed on the display devices of each group in the operation of the display system according to the fifth embodiment.

First, in the master group G1, a user operates the input instruction device 40 to give a display instruction for displaying the image data of the first to third pages 110-1 of "ABCD", 110-2 of "EFG", and 110-3 of "HIJK" (refer to FIG. 18) of the image data of the plurality of pages which is stored in the storage unit 31 of the control device 30. At this time, as illustrated in FIG. 18, in the master group G1, the image data display control unit 33 of the control unit 32 of the control device 30 displays the image data of the first page 110-1 of "ABCD", the image data of the second page 110-2 of "EFG", and the image data of the third page 110-3 of "HIJK" of the image data of the plurality of pages on the master display device 11-2, the slave display device 11-3, and the slave display device 11-4, respectively. At this time, in the master group G1, the image data display control unit 33 transmits, to the control devices 30 of the slave groups G2 and G3, the image data of the first page 110-1 of "ABCD" and starting page transmission information indicating that the transmission is performed for the image data of the first page 110-1 of "ABCD" In the slave group G2, in accordance with the starting page transmission information, the image data display control unit 33 of the control unit 32 of the control device 30 displays the image data of the first page 110-1 of "ABCD" from the control device 30 of the master group G1 on the slave display device 12-2. In the slave group G3, in accordance with the starting page transmission information, the image data display control unit 33 of the control unit 32 of the control device 30 displays the image data of the first page 110-1 of "ABCD" from the control device 30 of the master group G1 on the slave display device 13-2 (step S1 of FIG. 3; image data display processing).

In the master group G1, in a case where the user does not perform input to the image data display region 10A of the master display device 11-2 for a fixed time or more (No at step S2 of FIG. 3), the operation (display processing) of the display system according to the fifth embodiment moves to step S7 described below.

Otherwise, in the master group G1, the user inputs a letter or the like with a fingertip or a pen point to the image data display region 10A of the master display device 11-2 within the fixed time (Yes at step S2 of FIG. 3). At this time, in the master group G1, the input detection device 20 detects the input performed by the user to the image data display region 10A of the master display device 11-2, and generates input information 111 (refer to FIG. 19) (step 33 of FIG. 3; writing detection processing).

As illustrated in FIG. 19, in the master group G1, the input reflection display control unit 34 of the control unit. 32 of the control device 30 reflects the input information 111 (explanatory note) on the image data (in this case, the image data of the first page 110-1 of "ABCD") among the image data of the first page 110-1 of "ABCD", the image data of the second page 110-2 of "EFG", and the image data of the third page 110-3 of "HIJK", which is displayed on the master display device 11-2. At this time, in the master group G1, the input reflection display control unit 34 transmits, to the control devices 30 of the slave groups G2 and G3, the image data of the first page 110-1 of "ABCD" on which the input information 111 (explanatory note) is reflected and the above-described starting page transmission information. In the slave group G2, in accordance with the starting page transmission information, the image data display control unit 33 of the control unit 32 of the control device 30 displays, on the slave display device 12-2, the image data of the first page 110-1 of "ABCD" which is from the control device 30 of the master group G1 and on which the input information 111 (explanatory note) is reflected. In the slave group G3, in accordance with the starting page transmission information, the image data display control unit 33 of the control unit 32 of the control device 30 displays, on the slave display device 13-2, the image data of the first page 110-1 of "ABCD" which is from the control device 30 of the master group G1 and on which the input information 111 (explanatory note) is reflected (step S4 of FIG. 3; input reflection display processing).

In the master group G1, for example, the user performs an operation on (presses) the operation unit for page feeding 35 only once to the page operation display region 10B of the master display device 11-2. At this time, in the master group G1, the input detection device 20 detects, as the operation on the operation unit for page feeding 35, the input performed by the user to the page operation display region 10B of the master display device 11-2, and transmits a shift instruction to the control unit 32 of the control device 30 (step S5 of FIG. 3; operation detection processing).

As illustrated in FIG. 20, in the master group G1, in response to the shift instruction from the operation unit for page feeding 35, the image data display control unit 33 of the control unit 32 of the control device 30 displays, on each of the first to fourth display devices 11-1 to 11-4, among the image data of the plurality of pages, each of image data which is obtained by page feeding of the image data of the first to third pages 110-1 of "ABCD", 110-2 of "EFG", and 110-3 of "HIJK" by one page. That is, in the master group G1, in response to the shift instruction, the image data display control unit 33 displays, of the image data of the plurality of pages, the image data of the first page 110-1 of "ABCD" on which the input information 111 (explanatory note) is reflected, the image data of the second page 110-2 of "EFG", the image data of the third page 110-3 of "HIJK", and the image data of the fourth page 110-4 of "LMNOP" on the slave display device 11-1, the master display device 11-2, the slave display device 11-3, and the slave display device 11-4, respectively. At this time, in the master group G1, the image data display control unit 33 transmits, to the control devices 30 of the slave groups G2 and G3, the image data of the first page 110-1 of "ABCD" on which the input information 111 (explanatory note) is reflected, the image data of the second page 110-2 of "EFG", the image data of the third page 110-3 of "HIJK", and the image data of the fourth page 110-4 of "LMNOP". In the slave group G2, the image data display control unit 33 of the control unit 32 of the control device 30 displays, on each of the slave display devices 12-1 and 12-2, among the image data of the first page 110-1 of "ABCD" on which the input information 111 (explanatory note) from the control device 30 of the master group G1 is reflected, the image data of the second page 110-2 of "EFG", the image data of the third page 110-3 of "HIJK", and the image data of the fourth page 110-4 of "LMNOP", each of image data of the number corresponding to the number of the slave display devices 12-1 and 12-2 (the image data of the first page 110-1 of "ABCD" on which the input information 111 (explanatory note) as reflected and the image data of the second page 110-2 "EFG"). In the slave group G3, the image data display control unit 33 of the control unit 32 of the control device 30 displays, on each of the slave display devices 13-1 and 13-2, among the image data of the first page 110-1 of "ABCD" on which the input information 111 (explanatory note) from the control device 30 of the master group G1 is reflected, the image data of the second page 110-2 of "EFG", the image data of the third page 110-3 of "HIJK", and the image data of the fourth page 110-4 of "LMNOP", each of image data of the number corresponding to the number of the slave display devices 13-1 and 13-2 (the image data of the first page 110-1 of "ABCD" on which the input information 111 (explanatory note) is reflected and the image data of the second page 110-2 of "EFG") (step S6 of FIG. 3; page operation processing).

In a case where display of the image data of all pages finished or in a case where display of the image data is to be finished. (Yes at step S7), the operation (display processing) of the display system according to the fifth embodiment is finished. On the other hand, in a case where display of all pages is not finished or in a case where display of the image data is not to be finished (No at step S7), step S2 described above is performed.

As described above, in the display system according to the fifth embodiment, the plurality of display devices 10 and the control devices 30 are constituted by the plurality of groups G1 to G3 as illustrated in FIGS. 16 to 20. The control device 30 of the master group G1 that is a group among the plurality of groups G1 to G3, which is designated, displays, on each of the plurality of display devices 10 in the master group G1 (the slave display device 11-1, the master display device 11-2, the slave display device 11-3, and the slave display device 11-4), among the image data of the plurality of pages, each of image data of the number corresponding to the number of display devices 10 in the master group G1 (for example, the slave display device 11-1, the master display device 11-2, the slave display device 11-3, and the slave display device 11-4) (for example, the image data of the first page 110-1 of "ABCD" on which the input information 111 (explanatory note) is reflected, the image data of the second page 110-2 of "EFG", the image data of the third page 110-3 of "HIJK", and the image data of the fourth page 110-4 of "LMNOP"). Moreover, the control device 30 of the master group G1 transmits, to the control devices 30 of the slave groups G2 and G3 among the plurality of groups G1 to G3, which are groups other than the master group G1, the image data of the number of display devices 10 (in this case, the image data of the first page 110-1 of "ABCD" on which the input information 111 (explanatory note) is reflected, the image data of the second page 110-2 of "EFG", the image data of the third page 110-3 of "HIJK", and the image data of the fourth page 110-4 of "LMNOP"). The control devices 30 of the slave groups G2 and G3 display, on each of the plurality of display devices 10 in the slave groups G2 and G3 (in this case, the slave display devices 12-1 and 12-2 and the slave display devices 13-1 and 13-2), among the image data of the number of display devices 10 (in this case, the image data of the first page 110-1 of "ABCD" on which the input information 111 (explanatory note) is reflected, the image data of the second page 110-2 of "EFG", the image data of the third page 110-3 of "HIJK", and the image data of the fourth page 110-4 of "LMNOP"), which is from the control device 30 of the master group G1, each of image data of the number corresponding to the number of display devices 10 in each of the slave groups G2 and G3 (for example, the slave display devices 12-1 and 12-2 and the slave display devices 13-1 and 13-2) (in this case, the image data of the first page 110-1 of "ABCD" on which the input information 111 (explanatory note) is reflected and the image data of the second page 110-2 of "EFG").

In this manner, in the display system according to the forth embodiment, for example, even in a situation where there are three classrooms and a viewer (student) who is not able to enter a classroom (in this case, the master group G1) in which a user (teacher) stays enters one of the other classrooms (slave group G2 or G3), since each of the image data of the number of display devices 10 (in this case, the image data of the first page 110-1 of "ABCD" on which the input information 111 (explanatory note) is reflected and the image data of the second page 110-2 of "EFG") is displayed on each of the plurality of display devices 10 in the slave groups G2 and G3 (in this case, the slave display devices 12-1 and 12-2 and the slave display devices 13-1 and 13-2) in the other classrooms (slave groups G2 and G3), the viewer who stays in the other classrooms (slave group G2 and G3) is able to view the image data of the first page 110-1 of "ABCD" on which the input information 111 (explanatory note) is reflected and the image data of the second page 110-2 of "EFG", that is, image data of several pages at once.

Moreover, in the display system according to the fifth embodiment, each of the image data of the number of display devices 10 (in this case, the image data of the first page 110-1 of "ABCD" on which the input information 111 (explanatory note) is reflected, the image data of the second page 110-2 of "EFG", the image data of the third page 110-3 of "HIJK", and the image data of the fourth page 110-4 of "LMNOP") is displayed on each of the plurality of display devices 10 in the master group G1 (the slave display device 11-1, the master display device 11-2, the slave display device 11-3, and the slave display device 11-4) in the classroom (master group G1) in which the user (teacher) stays, and each of the image data of the number of display devices 10 (in this case, the image data of the first page 110-1 of "ABCD" on which the input information 111 (explanatory note) is reflected and the image data of the second page 110-2 of "EFG") is displayed on each of the plurality of display devices 10 in each of the slave groups G2 and G3 (in this case, the slave display devices 12-1 and 12-2 and the slave display devices 13-1 and 13-2) in the other classrooms (slave groups G2 and G3), so that it is possible to cope with even a case where a constituent of the display devices in the classroom (master group G1) in which the user (teacher) stays and constituents of the display devices in the other classrooms (slave groups G2 and G3) are different.

Sixth Embodiment

Figure 21:
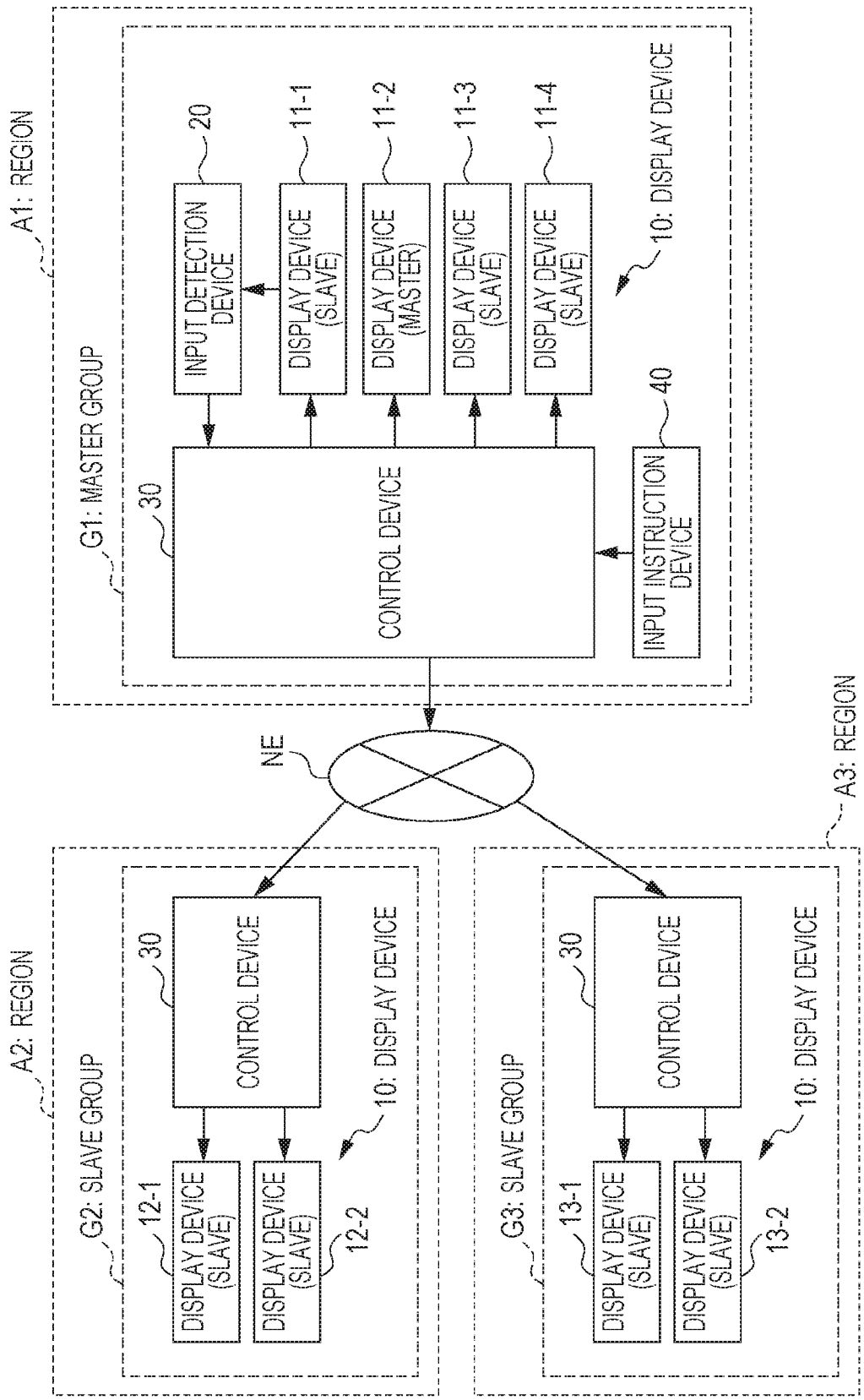
FIG. 21 is a block diagram illustrating a configuration of a display system according to a sixth embodiment.

FIG. 21 is a block diagram illustrating a configuration of a display system according to a sixth embodiment. In the sixth embodiment, a part changed from the fifth embodiment will be described.

In the display system according to the sixth embodiment, each of the plurality of groups G1 to G3 is provided in a different region. In the present embodiment, among the plurality of groups G1 to G3, the master group G1 is provided in a region A1, and the slave groups G2 and G3 are provided in regions A2 and A3, respectively. The control device 30 of the master group G1 is connected to the control devices 30 of the slave groups G2 and G3 via a network NE.

In this manner, in the display system according to the sixth embodiment, for example, in a case where school buildings (regions) of a classroom (master group G1) in which a user (teacher) stays and other classrooms (slave groups G2 and G3) are different, since it is difficult to connect the control device 30 of the master group G1 and the control devices 30 of the slave groups G2 and G3 with the use of a cable, it is preferable to connect the control device 30 of the master group G1 and the control devices 30 of the slave groups G2 and G3 with the use of the network NE.

As above, the invention is not limited to the embodiments described above, and may be modified in various manners within the scope of the claims. That is, an embodiment achieved by combining technical means appropriately modified within the scope of the claims is also encompassed is the technical scope of the invention.

REFERENCE SIGNS LIST 10 display device
10-1 display device (slave display device)
10-2 display device (slave display device)
10-3 display device (master display device)
10-4 display device (slave display device)
10A image data display region
10B page operation display region.
11-1 display device (master display device)
11-2 display device (slave display device)
11-3 display device (slave display device)
11-4 display device (slave display device)
12-1 display device
12-2 display device
13-1 display device
13-2 display device
20 input detection device
30 control device
31 storage unit
32 control unit
33 image data display control unit
34 input reflection display control unit.
35 page operation unit (operation unit for page feeding)
36 page operation unit (operation unit for page returning)
110-1 image data (image data of first page)
110-2 image data (image data of second page)
110-3 image data (image data of third page)
110-4 image data (image data of fourth page)
111 to 113 input information
210-1 image data (image data of first page)
210-2 image data (image data of second page)
210-3 image data (image data of third page)
210-4 image data (image data of fourth page)
A1 to A3 region
G1 group (master group)
G2 group (slave group)
G3 group (slave group)
NE network

The invention claimed is:

1. A display system, comprising:
a plurality of display devices that are arranged side by side;
an input detection device that detects an input performed by a user to a master display device among the plurality of display devices; and
a control device that is connected to the plurality of display devices and the input detection device, wherein
the control device includes:
an image data display control unit that performs control to display, on each of the plurality of display devices, each of image data of successive pages among image data of a plurality of pages, and
a shift display control unit that, in a case where an image data displayed on the master device among the image data of the successive pages is subjected to a page operation, performs control to display by shifting, on each of display devices arranged in a direction of the page operation from each of the display devices, each of the image data of the successive pages, wherein
in a case where a drawing input to the image data displayed on the master display device is detected, the image data display control unit displays the image data reflected information of the drawing input on the master display device, and
in a case where the image data displayed on the master device is subjected to the page operation, the image data being reflected the information of the drawing input, the shift display control unit displays by shifting the image data reflected the information of the drawing input on the each of display devices arranged in a direction of the page operation from each of the display devices.

2. The display device according to claim 1, wherein
each of the plurality of display devices includes image data display region that serves as a display region on which image data is displayed,
the master display device of the plurality of display devices further includes a page operation display region that serves as a display region on which the page operation unit is displayed, and
the input detection device:

detects, as the information of the drawing input, an input performed by the user to the image data display region of the master display device, and detects, as an operation on the page operation unit, an input performed by the user to the page operation display region of the master display device.

3. The display system according to claim 1, wherein in a case where there are N display devices as the plurality of display devices, one or a plurality of display devices, a number of which is less than N, are designated as master display devices.

4. The display system according to claim 1, wherein the plurality of display devices are arranged so as to be arrayed in a horizontal direction, the image data display control unit:

displays, on each of the plurality of display devices, among the image data of the plurality of pages, each of the image data of the number corresponding to the number of the plurality of display devices so as to be arrayed from a left side to a right side in order, in a case where letters represented by the image data of the plurality of pages are horizontally written, and displays, on each of the plurality of display devices, among the image data of the plurality of pages, each of the image data of the number corresponding to the number of the plurality of display devices so as to be arrayed from the right side to the left side in order, in a case where letters represented by the image data of the plurality of pages are vertically written.

5. The display system according to claim 1, wherein the plurality of display devices are arranged in a ring shape so that each display surface thereof serves as an inner peripheral surface.

6. The display system according to claim 1, wherein the plurality of display devices and control devices are constituted by a plurality of groups, the control device of a master group that is a group among the plurality of groups, which is designated, displays, on each of a plurality of display devices in the master group, among the image data of the plurality of pages, each of image data of a number corresponding to a number of the plurality of display devices in the master group, and transmits the image data of the number of display devices to the control device of a slave group among the plurality of groups, which is a group other than the master group, and the control device of the slave group displays, on each of a plurality of display devices in the slave group, among the image data of the number of display devices from the control device of the master group, each of image data of a number corresponding to a number of the plurality of display devices in the slave group.

7. The display system according to claim 6, wherein each of the plurality of groups is provided in a different region, and the control device of the master group is connected to the control device of the slave group via a network.

8. A display method comprising the steps of:

detecting an input performed by a user to a master display device among a plurality of display devices that are arranged side by side;

displaying, on each of the plurality of display devices, each of image data of successive pages among image data of a plurality of pages;

displaying by shifting, in a case where an image data displayed on the master device among the image data of the successive pages is subjected to a page operation, on each of display devices arranged in a direction of the page operation from each of the display devices, each of the image data of the successive pages;

displaying, in a case where a drawing input to the image data displayed on the master display device is detected, the image data reflected information of the drawing input on the master display device; and displays by shifting, in a case where the image data displayed on the master device is subjected to the page operation, the image data being reflected the information of the drawing input, the image data reflected the information of the drawing input on the each of display devices arranged in a direction of the page operation from each of the display devices.

* * * * *